US006490683B1

(12) United States Patent
Yamada et al.

(10) Patent No.: US 6,490,683 B1
(45) Date of Patent: Dec. 3, 2002

(54) OPTICAL DISK HAVING ELECTRONIC WATERMARK, REPRODUCING APPARATUS THEREOF AND COPY PROTECTING METHOD USING THE SAME

(75) Inventors: Hisashi Yamada, Yokohama; Hideo Ando, Tokyo; Tadashi Kojima; Kouichi Hirayama, both of Yokohama, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/149,008

(22) Filed: Sep. 8, 1998

(30) Foreign Application Priority Data

Sep. 16, 1997 (JP) ............................................. 9-251022

(51) Int. Cl.[7] ................................................ H04L 9/00
(52) U.S. Cl. ..................................................... 713/176
(58) Field of Search .......................... 713/176; 380/201, 380/54; 382/251; 369/275.4, 272, 53.41, 84, 126; 375/243; 705/57; 714/799–802, 805

(56) References Cited

U.S. PATENT DOCUMENTS

| 4,303,832 A | * 12/1981 | Ehrat ........................ 250/556 |
| 5,574,787 A | 11/1996 | Ryan |
| 5,592,454 A | 1/1997 | Tobita et al. |
| 5,623,459 A | * 4/1997 | Iwamura et al. ............... 369/32 |
| 5,889,868 A | * 3/1999 | Moskowitz et al. ......... 713/176 |
| 5,901,159 A | * 5/1999 | Ichikawa ..................... 714/765 |
| 5,915,027 A | * 6/1999 | Cox et al. ...................... 380/54 |
| 5,930,367 A | 7/1999 | Osawa et al. |
| 6,069,914 A | * 5/2000 | Cox ........................... 375/150 |

FOREIGN PATENT DOCUMENTS

| EP | 0 651 554 | 5/1995 |
| EP | 0 704 844 | 4/1996 |
| EP | 0 705 025 | 4/1996 |
| EP | 0 756 385 | 1/1997 |
| EP | 0 901 122 | 3/1999 |
| JP | 8-129828 | 5/1996 |
| JP | 9-128890 | 5/1997 |
| WO | 97/22206 | 6/1997 |

OTHER PUBLICATIONS

Patent Abstracts of Japan vol. 096, No. 009, Sep. 30, 1996 & JP 08 129828 A (Sony Disc Technol:KK), May 21, 1996.
Patent Abstracts of Japan vol. 097, No. 009, Sep. 30, 1997 & JP 09 128890 A (Sony Corp), May 16, 1997.

* cited by examiner

*Primary Examiner*—Gail Hayes
*Assistant Examiner*—Ho S. Song
(74) *Attorney, Agent, or Firm*—Pillsbury Winthrop LLP

(57) ABSTRACT

A copy protecting method for an optical medium includes a writing step of writing watermark data as ECC data in a data storage area of a disk having a certain data stored therein.

22 Claims, 16 Drawing Sheets

FIG. 7A
a b c d e f g h i
a~i : 1 or 0
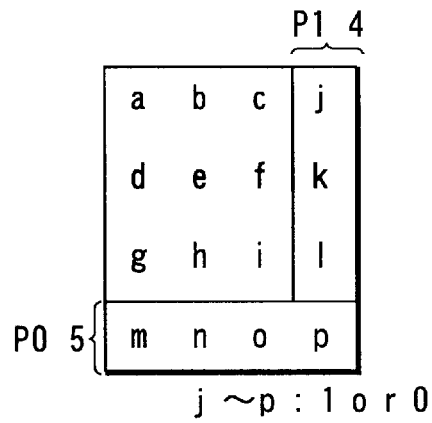
FIG. 7B
j~p : 1 or 0
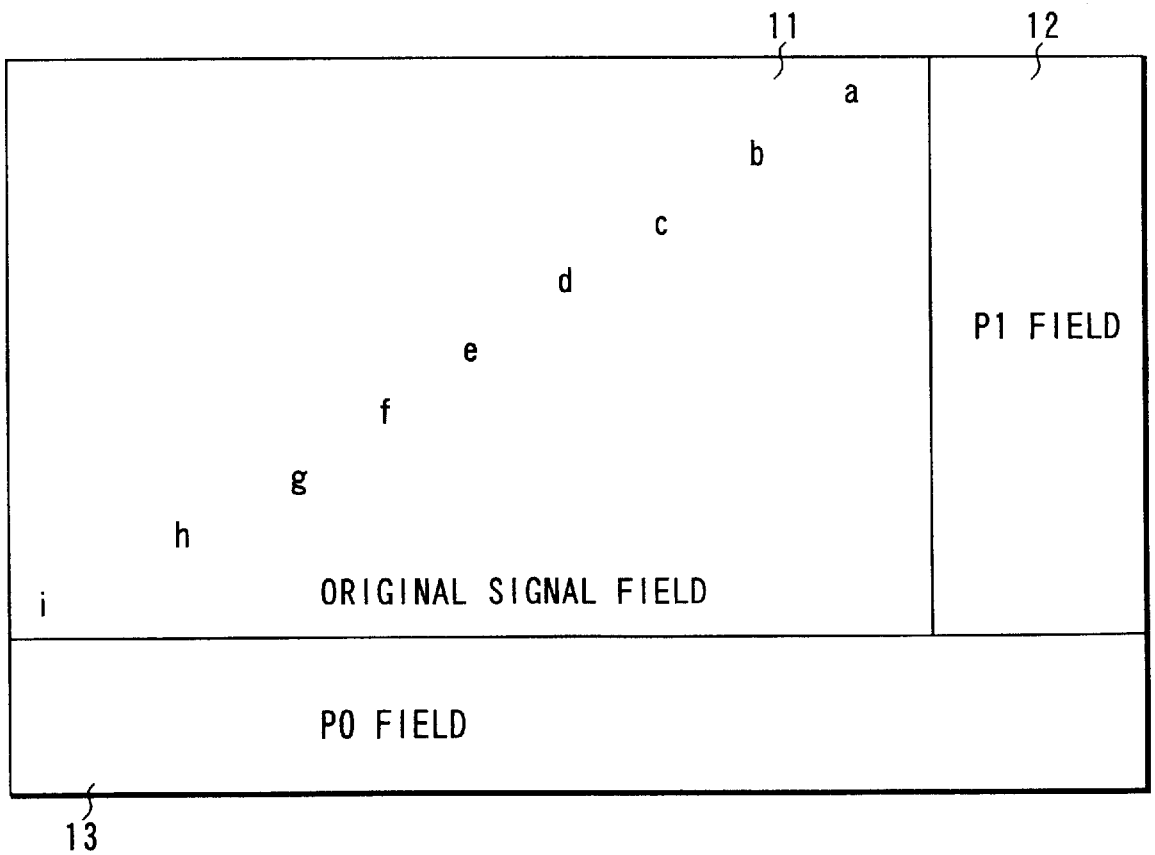
FIG. 8

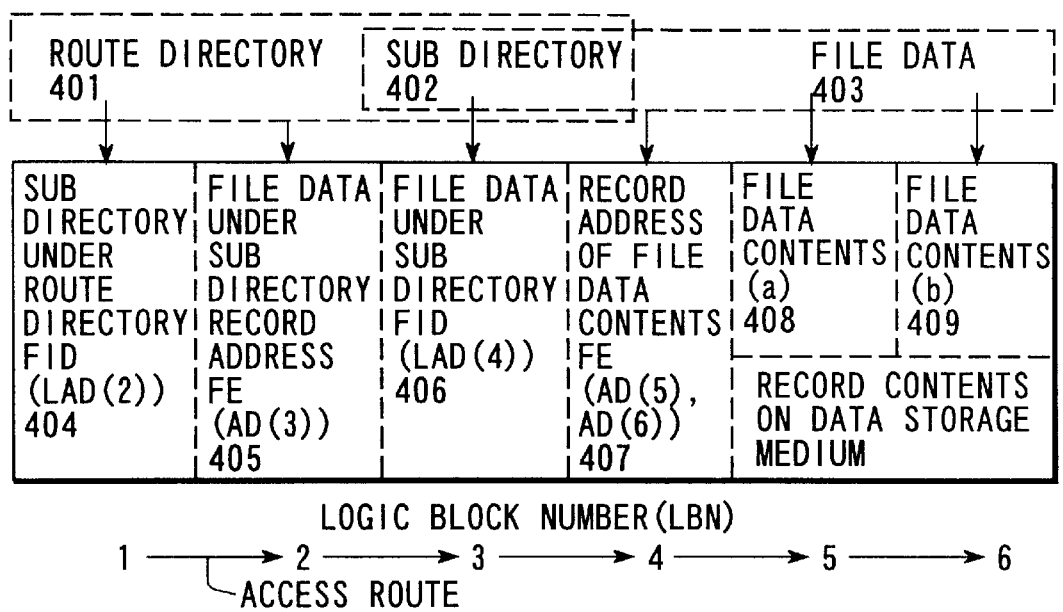

FIG. 14

LAD (LOGIC BLOCK NUMBER)
···RECORD ADDRESS OF EXTENT ON DATA STORAGE MEDIUM

| LENGTH OF EXTENT 410 (LOGIC BLOCK NUMBER) [4 BYTE] | ADDRESS OF EXTENT 411 (LOGIC BLOCK NUMBER) [4 BYTE] | IMPLEMENTATION USE 412 (DATA FOR ARITHMETIC PROCESS) [8 BYTE] |
|---|---|---|

FIG. 15

AD (LOGIC BLOCK NUMBER)
···RECORD ADDRESS OF EXTENT ON DATA STORAGE MEDIUM

| LENGTH OF EXTENT 410 (LOGIC BLOCK NUMBER) [4 BYTE] | ADDRESS OF EXTENT 411 (LOGIC BLOCK NUMBER) [4 BYTE] |
|---|---|

FIG. 16

USE(AD(*), AD(*), ···, AD(*))
···REFER TO EXTENT BEING NOT RECORDED,
USE BY DESCRIPTIVE AS SPACE TABLE

| DESCRIPTIVE TAG(≡263) IDENTIFIER OF DESCRIPTION CONTENTS 413 [16 BYTES] | TYPE OF ICB TAG FILE (TYPE=1) 414 [20 BYTES] | LENGTH OF ALLOCATION DESCRIPTIVE (BYTE LENGTH) 415 [4 BYTES] | ADDRESSES ON MEDIUM OF ALLOCATION DESCRIPTIVE EACH EXTENT ARE SHOWED SIDE BY SIDE (AD(*), AD(*), ···, AD(*)) 416 |
|---|---|---|---|

FIG. 17

FE(AD(*), AD(*), ···, AD(*))
···RECORD ADDRESS ON STORAGE MEDIUM OF FILE
DESIGNATED IN FID IN LAYERED DIRECTORY

| DESCRIPTIVE TAG(≡261) IDENIFIER OF DESCRIPTION CONTENTS [16 BYTES] | TYPE OF ICB TAG FILE (TYPE=4/5) 418 [20 BYTES] | PERMISSION DATA FOR RECORD, REPRODUCE, DELETE EVERY PERMISSION USERS 419 [32 BYTES] | ADDRESSES ON MEDIUM OF ALLOCATION DESCRIPTIVE EACH EXTENT ARE SHOWED SIDE BY SIDE (AD(*), AD(*), ···, AD(*)) 420 |
|---|---|---|---|

FIG. 18

FID(LAD(LOGIC BLOCK NUMBER))
···FILE(ROUTE DIRECTORY, SUB DIRECTORY,
FILE DATA, AND SD ON) ARE DESCRIBED

| DESCRIPTIVE TAG(≡257) IDENTIFIER OF DESCRIPTION CONTENTS [16BYTES] | SORT OF FILE CHARACTERISTIC FILE 422 [1 BYTE] | RECORD ADDRESS OF DATA CONTROL BLOCK FE (LAD(*)) 423 | FILE IDENTIFIER DIRECTORY NAME OR FILE DATA NAME 424 | PADDING DUMMY FIELD (000h) 437 |

| LSN | LBN | STRUCTURE 441 | DESCRIPTIVE 442 | CONTENTS 443 |
|---|---|---|---|---|
| 0~15 | | | RESERVE 459 (ALL 00h BYTE) | |
| 16 | | VOLUME RECOGNITION SEQUENCE 444 | EXTENT AREA DESCRIPTIVE START 445 | VRS START ADDRESS |
| 17 | | | VOLUME STRUCTURE DESCRIPTIVE 446 | DESK CONTENTS EXPLANATION |
| 18 | | | BOOT DESCRIPTIVE 447 | BOOT START ADDRESS |
| 19 | | | EXTENT AREA DESCRIPTIVE END 448 | VRS END ADDRESS |
| ~31 | | | RESERVE (ALL 00h BYTE) | |
| 32~ | | | OMIT | |
| 34 | | MAIN VOLUME DESCRIPTIVE SEQUENCE 449 | PARTITION DESCRIPTIVE 450<br><br>PARTITION CONTENTS USAGE 451<br><br>SPACE TABLE NOT TO ALOCATE 452 AD(80)<br><br>SPACE BIT MAP NOT TO ALOCATE 453 AD(0) | RECORD ADDRESS OF SPACE TABLE<br><br>RECORD ADDRESS OF SPACE BIT MAP |
| 35 | | | LOGIC VOLUME DESCRIPTIVE 454<br><br>LOGIC VOLUME CONTENTS USAGE 455 LAD(100) | RECORD ADDRESS OF FILE SET DESCRIPTIVE 472 |
| ~47 | | | OMIT | |
| ~63 | | | OMIT | |
| ~255 | | | RESERVE 461 (ALL 00h BYTE) | |
| 256 | | FIRST ANCHOR POINT 456 | ANCHOR VOLUME DESCRIPTIVE POINTER 458 | |
| ~271 | | | RESERVE 462 (ALL 00h BYTE) | |
| | | | | |

FIG. 21

| | | | | |
|---|---|---|---|---|
| 272~321 | 0~49 | | SPACE BIT MAP DESCRIPTIVE 470 | MAPPING OF SPACE BIT MAP RECORD, NON-RECORD |
| 322~371 | 50~99 | | USE(AD(*),AD(*), ...,AD(*)) 471 | EXTENT LIST OF STATUS OF NON RECORDED OF SPACE TABLE |
| 372 | 100 | | FILE SET DESCRIPTIVE 472, ROUTE DIRECTORY ICB473;LAD(102)474 | RECORD ADDRESS OF ROUTE DIRECTORY |
| 373 | 101 | | OMIT | |
| 374 | 102 | | ROUTE DIRECTORY AFE(AD(103)) 475 | RECORD ADDRESS OF FIDs |
| 375 | 103 | | FID IN A (LAD(104), LAD(110))476 | ADDRESS OF B,D |
| 376 | 104 | | PARENT DERECTORY EFE (AD(105))477 | RECORD ADDRESS OF FIDs |
| 377 | 105 | | FID IN B (LAD(106)) 478 | ADDRESS OF C |
| 378 | 106 | FILE STRUCTURE 486 | FE(AD(107)AD(108) AD(109))479 | FILE DATA ADDRESS |
| 382 | 110 | | FE IN DIRECTORY (AD(111))480 | ADDRESS OF FIDs |
| 383 | 111 | | FID IN D (LAD(112), LAD(NON)) 481 | ADDRESS OF E,F |
| 384 | 112 | | FE IN SUB DIRECTORY FE(AD(113))482 | RECORD ADDRESS OF FIDs |
| 385 | 113 | | FID(LAD(NON), LAD(114),LAD(118))483 | ADDRESS OF H,I |
| 386 | 114 | | FE(AD(115)AD(116) AD(117)) 484 | ADDRESS OF FILE DATA |
| 390 | 118 | | FE IN I(AD(119),AD (120)) 485 | ADDRESS OF FILE DATA |
| 379~ | 107~ | FILE DATA 487 | DATA OF FILE DATA C 488 | |
| 387~ | 115~ | | DATA OF FILE DATA H 489 | |
| 391~ | 119~ | | DATA OF FILE DATA I 490 | |

FIG. 22

| | | | |
|---|---|---|---|
| LLSN-271 ~ LLSN-257 | | RESERVE 463 (ALL 00h BYTE) | |
| LLSN-256 | SECOND ANCHOR POINT 457 | ANCHOR VOLUME DESCRIPTIVE POINTER 458 | |
| LLSN-255 ~ LLSN-224 | | RESERVE 464 (ALL 00h BYTE) | |
| LLSN-223 ~ LLSN-208 | RESERVE VOLUME DESCRIPTIVE SEQUENCE 467 | PARTITION DESCRIPTIVE 450<br><br>PARTITION CONTENTS USAGE 451<br><br>SPACE TABLE NOT TO ALOCATE 452<br><br>SPACE BIT MAM NOT TO ALOCATE 453<br><br>LOGIC VOLUME DESCRIPTIVE 454<br><br>LOGIC VOLUME CONTENTS USAGE 455 | BACK UP OF MAIN VOLUME DESCRIPTIVE SEQUENCE |
| LLSN-207 ~ LLSN | | RESERVE 465 (ALL 00h BYTE) | |

FIG. 23

OPTICAL DISK HAVING ELECTRONIC WATERMARK, REPRODUCING APPARATUS THEREOF AND COPY PROTECTING METHOD USING THE SAME

BACKGROUND OF THE INVENTION

This invention relates to copy protection of recording data in a disk recording/reproducing system (medium, recording apparatus, reproducing apparatus).

Further, this invention relates to copy protection for a data recording medium which requires a dishonest copy preventing process for protection of copyright or the like.

Further, this invention relates to copy protection for a reproducing apparatus for reproducing data from a data recording medium such as an optical disk by use of convergent light obtained by converging a laser beam.

Conventionally, copy protection techniques have been used for protecting the copyright of video software or the like. As a typical example of software which requires copy protection, a DVD video disk and DVD-ROM disk using a digital recording system are provided (DVD is an abbreviation for a digital video disk or digital versatile disk). Conventionally, encryption has been used for copy protection of digital recording video software.

The copy protection method using encryption is effective in DVD video disk or DVD-ROM disk in which encrypted data is recorded. However, in the case of a DVD-RAM in which the user can newly record data, the following problems occur.

(1) It is difficult to manage an encryption key necessary at the time of encryption.

(2) It is difficult to attain a strong encryption process for a disk recording/reproducing apparatus (such as a DVD-RAM recorder that effectuates digital recording and reproducing processes similar to an analog video cassette recorder under the control of a user. In addition, the encryption process may easily be deciphered.

(3) In a case where the encrypting and decrypting processes occur in a disk recording/reproducing apparatus, a copy of the data content to be protected from being copied can be made by decrypting data that is formed and encrypted using another disk recording/reproducing apparatus and encrypting the data again.

Accordingly, when the above recording/reproducing apparatus of digital video data is used, it is difficult to attain an effective copy protecting process using the above encryption technique.

Further, improving the copy protecting process by using an independent method for the DVD-RAM data recording medium complicates the copy protection processing circuit when the data recording medium is reproduced by a DVD-ROM driver or when the DVD-ROM disk is reproduced by a DVD-RAM driver, increasing the production costs of the DVD-RAM and DVD-RAM drivers.

BRIEF SUMMARY OF THE INVENTION

A copy protection system that prevents unauthorized copying of a recordable digital data recording medium, such as a DVD-RAM disk, is disclosed and can be used with various data recording mediums that contain reproduction-only data recording media.

The disclosed invention is a copy protecting method for an optical medium that writes watermark data, such as error correction control (ECC) data, to a data storage area of a disk.

The disclosed invention further comprises a step of extracting the watermark data from ECC data on the disk and comparing the extracted watermark data with collation data to determine the validity of the disk based on the result of the comparison.

The following example describes the method and system of the present invention. Consider a case where a party wants to copy dishonestly a disk onto another disk using separately a disk reproducing apparatus and a disk recording apparatus that receives an output from the disk reproducing apparatus. When the party loads the disk into the reproducing apparatus that reads the disk, storage data such as video image data is output from the disk and the reproducing apparatus. Watermark data and error correction data is eliminated, however, by an error correction circuit in the reproducing apparatus. Accordingly, the disk storage data having the eliminated electronic watermark data is output from the reproducing apparatus to the recording apparatus, and the recording apparatus records the storage data without the electronic watermark data into a new disk.

When the new disk is read by a reproducing apparatus having an electronic watermark collating function, the electronic watermark cannot be extracted, the collating function cannot be performed, and the disk is detected as an invalid disk. Thus, a copy-protected disk that prevents dishonest copying by a normal disk reproducing apparatus and a normal disk recording apparatus is attained.

The copy protecting method of this invention eliminates the electronic watermark data at the time of dishonest copying by use of the error correction circuit that is provided in a DVD reproducing apparatus.

Further, the present invention includes an optical medium having a data storage area provided on an optical disk that stores digital data and a plurality of ECC blocks that store watermark data as ECC data together with other certain data.

The present invention describes a disk that stores electronic watermark data used in the copy protecting method. The electronic watermark data is stored as ECC data in each ECC block of the data storage area and is read out and compared with collation data in the reproducing apparatus. If a similarity of certain level or higher level is attained between the electronic watermark and collation data, the disk is determined to be a valid disk. If the similarity of certain level cannot be detected, however, the disk is determined to be an invalid disk, an error message is displayed to a user, and disk reproduction is interrupted.

Further, the present invention comprises an optical disk reproducing apparatus having an extracting means for extracting watermark data from ECC data stored in a storage area of the optical disk in which the watermark data is stored as the ECC data.

The present invention compares the extracted watermark data with the collation data to determine a validity of the disk based on a result of the comparison, eliminates the error data and watermark data from the certain data based on the ECC data, and outputs the certain data.

The present invention further describes the electronic watermark data collating function of the reproducing apparatus for protection from dishonest copying. The electronic watermark data, stored as the ECC data, is extracted by the reproducing apparatus and is compared and collated with collation data stored in part of a recording area of the disk. If a similarity of certain level or higher level is attained between the electronic watermark data and collation data, the disk is determined to be a valid disk having the electronic watermark. Otherwise, the disk is determined to be an invalid disk.

Since the electronic watermark data is eliminated as ECC data by the error correction circuit after the collating process, image data or the like can be recorded if an output of the reproducing apparatus is connected to an input of the recording apparatus to copy dishonestly the disk into a new disk. All of the data containing the electronic watermark data, however, cannot be copied. Accordingly, the error correction circuit of the reproducing apparatus provides the copy protection of the present invention.

Additional objects and advantages of the invention are set forth in the description that follows, and in part are obvious from the description or may be learned by practice of the invention. The objects and advantages of the invention are realized and obtained by means of the instrumentalities and combinations particularly pointed out hereinafter.

BRIEF DESCRIPTION OF THE SEVERAL VIEWS OF THE DRAWINGS

The accompanying drawings, incorporated in and constituting a part of the specification, illustrate embodiments of the invention. Together with the general description given above and the detailed description of the embodiments given below, the drawings serve to explain the principles of the invention.

FIGS. 7A and 7B are diagrams that show a content of the electronic watermark data having a parity code attached thereto;

FIG. 8 is a diagram that shows an example in which the position of electronic watermark data inserted in the ECC block according to another embodiment of the invention is changed;

FIG. 14 is a diagram that shows the basic relation between the hierarchical file system structure and the contents of data recorded on a data recording medium;

FIG. 15 is a diagram that illustrates the description contents of a long allocation descriptor;

FIG. 16 is a diagram that illustrates the description contents of a short allocation descriptor;

FIG. 17 is a diagram that illustrates the description contents of unallocated space entry;

FIG. 18 is a diagram that illustrates the description contents of file entry that is partly extracted;

FIG. 21 is a first partial diagram that illustrates an example in which a file system is constructed on the data recording medium according to a universal disk format (UDF);

FIG. 22 is a second partial diagram that illustrates an example in which a file system is constructed on the data recording medium according to the UDF together with FIG. 21; and FIG. 23 is a third partial diagram that illustrates an example in which a file system is constructed on the data recording medium according to the UDF together with FIGS. 21 and 22.

DETAILED DESCRIPTION OF THE INVENTION

A copy protecting system that uses an electronic watermark is described according to the invention with reference to the accompanying drawings.

A medium and a recording/reproducing apparatus for reproducing the medium are explained in detail below.

Figure 1A:
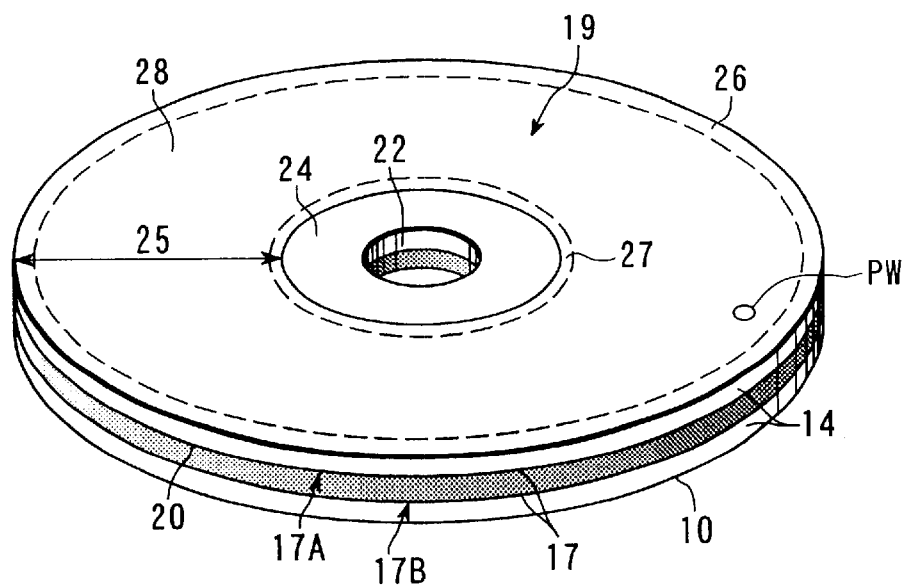
FIG. 1A is a perspective view that illustrates the structure of a variably recordable optical disk used in a DVD digital video recorder.

FIG. 1A is a perspective view that illustrates the structure of a variably recordable optical disk used in a DVD digital video recorder. As shown in FIG. 1A, the optical disk 10 has a structure in which a pair of transparent substrates 14, having recording layers 17 formed thereon, are laminated to each other by an adhesive layer. Each of the substrates 14 can be formed of a polycarbonate film of 0.6 mm thickness, and the adhesive layer 20 can be formed of an extremely thin ultraviolet curing resin being, for example, 40 mm. The large-capacity optical disk 10, having a 1.2 mm thickness, can be obtained by laminating the pair of substrates 14, being 0.6 mm thickness, with the recording layers 17 set in contact with the surfaces of the adhesive layer 20.

The recording layers 17 can be formed to have a ROM/RAM two-layered structure. In this case, a RAM layer/phase variation recording layer 17B is formed in a far-distant position as viewed from a readout surface 19.

The optical disk 10 has a central hole 22, and a clamp area 24 is formed around the central hole 22 on each surface of the disk for clamping of the optical disk 10 at the time of rotation driving. A spindle of a disk motor is inserted in the central hole 22 when the optical disk 10 is loaded on a disk driving device (not shown). A disk damper (not shown) clamps the optical disk 10 in the clamp area 24 during rotation.

The optical disk 10 has a data area 25 in which video data, audio data and other data can be recorded around the clamp area 24.

A lead-out area 26 is formed on the outer peripheral side of the data area 25, and a lead-in area 27 is formed on the inner peripheral side surrounding the clamp area 24. A data recording area 28 is defined between the lead-out area 26 and the lead-in area 27.

For example, a recording track is continuously formed in a spiral form on the recording light reflection layer 17 of data area 25. The continuous track is divided into a plurality of physical sectors, with consecutive numbers being attached to the sectors. Various data is recorded on the optical disk 10 by using the sector as a recording unit.

The data recording area 28 includes an actual data recording area and a (main) video data, and sub-video data, such as a caption and menu, and audio data, such as a speech and sound effect of a movie or the like, are recorded as recording/reproducing data in the form of pit string data. Pit string data has a phase status or physical shape that causes an optical variation in laser reflection light.

If the optical disk 10 is a double-faced recording RAM disk with each surface formed of a single layer, each of the recording layers 17 can be formed of a three-layered structure in which a phase variation recording material layer (for example, $Ge_2Sb_2Te_5$) is held between two layers of mixtures of zinc sulfide and silicon oxide ($ZnS\ SiO_2$).

If the optical disk 10 is a single-faced recording RAM disk with each surface formed of a single layer, the recording layer 17 on the readout surface 19 side can be formed of a three-layered structure containing the above phase variation recording material layer. In this case, the layer 17 located far apart as viewed from the readout surface 19 is not necessarily a data recording layer and may be a dummy layer.

If the optical disk 10 is a single-faced reading type two-layered RAM/ROM disk, the two recording layers 17 can be formed of a phase variation recording layer in a far-distant position as viewed from the readout surface 19 for reading/writing, and a semi-transparent metal reflection layer in a nearer position as viewed from the readout surface 19 for reproducing data only.

If the optical disk 10 is a write once DVD-R, polycarbonate can be used for the substrate, gold can be used for a reflection film (not shown), and ultraviolet curing resin can be used for a protection film (not shown). In this case, an organic coloring matter is used for the recording layer 17. As the organic coloring matter, cyanin, squalelium, clokonick, triphenylmenthane-series coloring matter, xanthene, quinone-series coloring matter (such as naphtoquine, anthraquine or the like), and metal complex-series coloring matter (such as phtalocyan, porphyrin, dithiol comlex or the like) or the like can be used.

Writing data into the DVD-R disk is performed by using a semiconductor laser having a wavelength of 650 nm and an output power of 6 to 12 mW.

If the optical disk 10 is a single-face reading type two-layered ROM disk, the two recording layers 17 can be formed of a metal reflection layer in a far-distant position as viewed from the readout surface 19, and a semi-transparent metal reflection layer in a nearer position as viewed from the readout surface 19.

In the read-only DVD-ROM disk 10, a pit string is previously formed in the substrate 14 by use of a stamper. A reflection layer such as a metal layer is formed on the surface of the substrate 14 on which the pit string is formed. The reflection layer is used as the recording layer 17. With the above DVD-ROM disk 10, generally, a groove used as the recording track is not specifically formed, and the pit surface formed on the surface of the substrate 14 is used as the track.

In the various types of optical disks 10 described above, ROM data is recorded on the recording layer 17 as an emboss signal. In contrast, such an emboss signal is not formed in the substrate 14 having the reading/writing (or write once) type recording layer 17, but a continuous groove is formed instead. A phase variation recording layer is formed in the groove. In the case of a reading/writing type DVD-RAM disk, a phase variation recording layer on the land portion in addition to the groove portion is used for data recording.

If the optical disk 10 is a single-face reading type (irrespective of whether the recording layer is a single-layered type or double-layered type), the substrate 14 that is on the rear surface side as viewed from the readout surface 19 is not necessarily transparent with respect to the reading/writing laser beam. In this case, a label printing may be made on the whole surface of the rear side substrate 14.

A DVD digital video recorder, described later, is so constructed that the repetitive recording/reproducing (reading/writing) operation for the DVD-RAM disk (or DVD-RW disk), the one time recording/repetitive reproducing operation for the DVD-R disk, and the repetitive reproducing operation for the DVD-ROM disk can be performed.

Electronic watermark data according to this invention is stored into a preset area in the above-described medium.

Figure 1B:
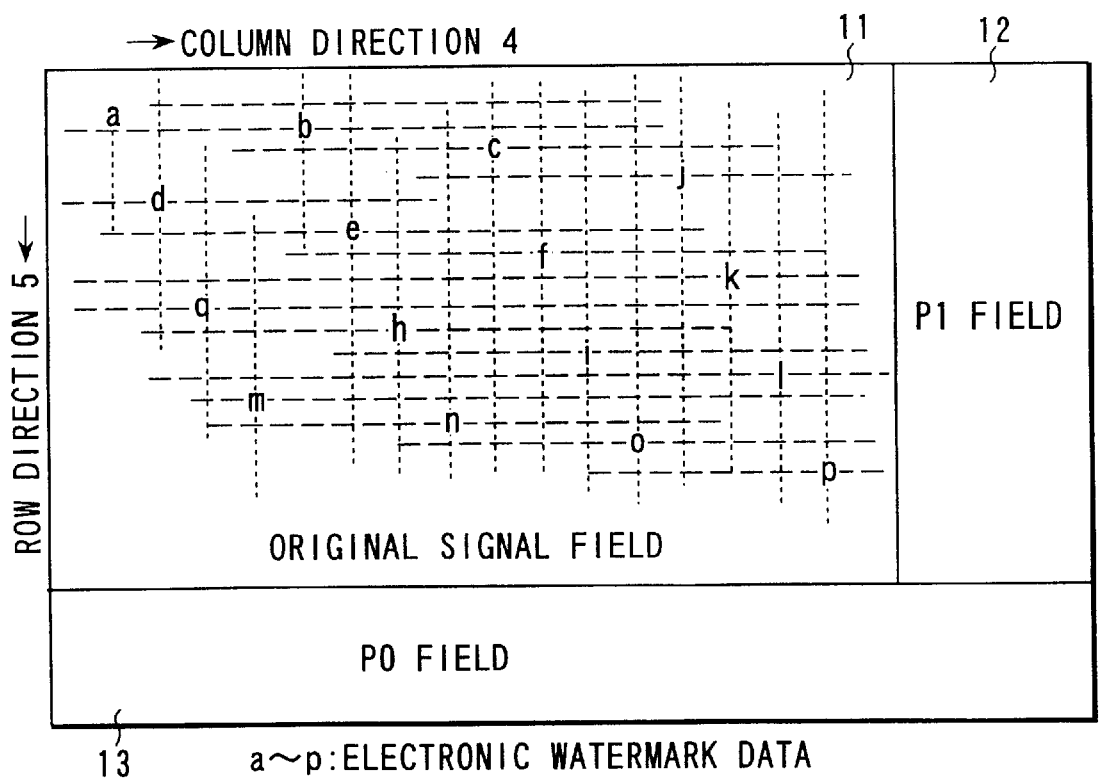
FIG. 1B is a diagram that shows an ECC block containing electronic watermark data therein according to an embodiment of the invention.

FIG. 1B is a diagram showing an ECC block containing electronic watermark data according to an embodiment of the invention. An example of one ECC block structure is shown when data is recorded as the ECC block is used as one unit on are producing-only data recording medium, such as a DVD-ROM or DVD video.

An error correction code (ECC code) called an inner parity code (PI) is attached in a column direction 4 to data recorded in an original signal field 11 before an error correction code is attached. The code is arranged in a PI field 12 in FIG. 1B. In addition, an ECC code, called an outer parity code (PO), is calculated and arranged in a PO field 13.

In this state, electronic watermark data items of a to p (a to p is 1-bit data of "1" or "0") are inserted in preset positions in a preset sequence in an overwriting manner. Then, data is recorded on a rewritable data recording medium such as a DVD-RAM, with the configuration of FIG. 1B remaining unchanged.

When data is reproduced from the data recording medium, electronic watermark data is read out by extracting data items a to p from the preset position according to the predetermined sequence. If the readout electronic watermark data coincides with collation data, data recorded on the data recording medium is determined to be original data and not dishonestly copied.

Electronic watermark data of a to p in FIG. 1B is regarded as added intentionally defective data as viewed from the outer parity code or inner parity code in the ECC block. Therefore, when data shown in FIG. 1 is reproduced, the defective electronic watermark data of a to p is corrected by the error correction process. Thus, an original signal having its contents prevented from being dishonestly copied can be obtained before the electronic watermark data is inserted.

Now, consider a case where a dishonest third party copies data having the electronic watermark data eliminated by the error correction process on a digital recordable data recording medium such as a DVD-RAM or a DVD-ROM. In this case, only data containing no electronic watermark data is obtained after the error correction process. The data is transferred and copied in a disk at the dishonest copy destination. That is, data without the electronic watermark data, eliminated by the error correction function, is copied to the dishonest copy destination.

When data dishonestly copied on the data recording medium is reproduced by a reproducing apparatus, no electronic watermark data is detected, even if the electronic watermark data of a to p is searched for. In this case, the recorded data medium is determined to be a dishonestly copied medium, an alarm display indicating that a dishonest copy has been made is shown, and the reproducing process is interrupted.

If the data amount of the electronic watermark data (a to p) of FIG. 1B increases, the error correction ability is exceeded and there is a possibility that data added before the electronic watermark data cannot be reproduced. That is, the electronic watermark data amount that can be added for each ECC block has an upper limit. The upper limit value is preferably set to approx. 1/10000 or less of the whole data amount that constructs one ECC block. The upper limit value is determined by taking a certain amount of margin with respect to error correction ability into consideration when a product code is used for the error correction system.

As an example, in the DVD standard utilizing the product code in the error correction system, it is preferable to set the amount of electronic watermark data for one ECC block to approx. 3 bytes or less because the whole data amount for one ECC block is approx. 32 kilo-bytes. That is, it is preferable to express the electronic watermark data by a combination of one-bit codes using up to 24 or 26 bits in total.

In a product code ECC block of 32 kilo-byte units used in the DVD, the error correction for errors up to 5 bits for one column in the column direction 4 in FIG. 1B can be made. Likewise, the error correction for errors up to 5 bits for one row in the row direction 5 can be made. Therefore, electronic watermark data of 5 bits at maximum for each column or row can be inserted.

However, in order to make it possible to effect the error correction process, even if a large amount of errors due to defects on the data recording medium occur, it becomes necessary to distribute and insert the electronic watermark data into an ECC block so that the electronic watermark data will not be localized in a specified column or row. In the example of FIG. 1B, the electronic watermark data is arranged in a staggered form to set the amount of electronic watermark data for one column or one row to one bit or less.

The explanation thus far has been a basic explanation of a case where data, having the structure of FIG. 1B, is recorded previously on the reproducing-only data recording medium, such as a DVD-ROM. The present invention can also be applied to a recordable data recording medium, such as a DVD-RAM.

The construction of a disk recording/reproducing apparatus is explained before the method for recording data on the recordable recording medium by the user.

The disk recording/reproducing apparatus is roughly divided into 1) a disk recording/reproducing section having a physical series block, for recording and reproducing data with respect to the data recording medium, 2) an application block constructing section, constructed by a function performing section for performing independent apparatus functions as the disk recording/reproducing apparatus, and 3) an interface section with respect to the exterior.

The internal construction of the disk recording/reproducing section (physical series block) in the disk recording/reproducing apparatus is explained with reference to FIG. 13.

<<Basic Function of Disk Recording/Reproducing Section>>

In the disk recording/reproducing section, new data is recorded or rewritten (including deleted data) in a preset position on a data recording medium (optical disk) 201 by using a convergent light spot of a laser beam.

Data that already is recorded is reproduced from a preset position on the data recording medium (optical disk) 201 by use of a convergent light spot of a laser beam.

<<Basic Function Performing Means of Disk Recording/Reproducing Section>>

In order to play the recording/reproducing section, a convergent light spot is traced along a track (not shown) on the data recording medium 201 in the disk recording/reproducing section. The data recording/reproducing/deleting operations are switched by changing the light amount (or strength) of the convergent light spot applied to the data recording medium 201. A recorded signal d supplied from an outside source is converted to an optimum signal to record the signal at a high density and a low error rate.

<Signal Detection by Optical Head 202>

The optical head 202 is constructed by a semiconductor laser element (not shown) that is a light source, a photodetector and an object glass.

Laser light emitted from the semiconductor laser element is converged on the data recording medium (optical disk) 201 by the object glass. Laser light reflected from a light reflection film or light reflective recording film of the data recording medium (optical disk) 201 is converted photoelectrically by the photodetector.

A detected current obtained in the photodetector is subjected to a current-voltage conversion by an amplifier 213 and is used as a detection signal. The detection signal is processed by a focus track error detecting circuit 217 or a binarizing circuit 212.

Generally, the photodetector is divided into a plurality of light detecting areas to detect individually variations in the amounts of light applied to the respective light detecting areas. The calculations of addition and subtraction are performed for the individual detection signals in the focus track error detection circuit 217 to detect focus deviation and track deviation. After the detected focus deviation and track deviation are substantially eliminated, a variation in the amount of reflected light from the light reflection film or light reflective recording film of the data recording medium (optical disk) 201 is detected, and a signal on the data recording medium 201 is reproduced.

<Focus Deviation Detecting Method>

For optically detecting the focus deviation amount, the following methods are provided.

[Astigmatism Method]

The Astigmatism Method arranges an optical element (not shown) that causes astigmatism in the detection optical path of laser light reflected from light reflection film or light reflective recording film of the data recording medium (optical disk) 201 and detects a variation in the shape of the laser light applied to the photodetector. The light detecting area is divided into four areas by the diagonal lines. A difference between two added detection signals for the diagonal positions among the detection signals derived from the light detecting areas is derived by the focus track error detecting circuit 217 to obtain a focus error detection signal.

[Knife-Edge Method]

The Knife-Edge Method arranges a knife edge that asymmetrically shields part of laser light reflected from the data recording medium 201. The light detecting area is divided into two areas and a difference between the detection signals derived from the detection areas is derived to obtain a focus error detection signal.

<Track Deviation Detecting Method>

The data recording medium 201 has a spiral-form track or concentric tracks, and data is recorded on the track. A convergent light spot is traced along the track to reproduce, record, or delete data. In order to trace stably the convergent light spot along the track, it is necessary to detect optically the relative positional deviation between the track and the convergent light spot.

The following methods are used generally to implement the track deviation detecting method.

[Differential Phase Detection Method]

The Differential Phase Detection Method detects a variation in the strength distribution on the photodetector of a laser light reflected from the light reflection film or light reflective recording film of the data recording medium (optical disk) 201. The light detecting area is divided into four areas by diagonal lines. A difference between added detection signals (for the diagonal positions among the detection signals derived from the light detecting areas) is derived by the focus track error detecting circuit 217 to obtain a track error detection signal.

[Push-Pull Method]

The Push-Pull Method detects a variation in the strength distribution on the photodetector of laser light reflected from the data recording medium 201. The light detecting area is divided into two areas, and a difference between the detection signals derived from the detection areas is derived to obtain a track error detection signal.

[Twin-Spot Method]

The Twin-Spot Method arranges a diffracting element or the like in a light transmission system between the semiconductor laser element and the data recording medium 201 to divide light into a plurality of wave fronts and detects a variation in the amount of reflected light of primary diffraction light applied to the data recording medium 201. A light detection area (for individually detecting variations in the amounts of reflection light of +primary diffraction light and −primary diffraction light) is arranged separately from the light detection area for detecting a reproduced signal. A difference between the detection signals is derived to obtain a track error detection signal.

<Object Glass Actuator Structure>

An object glass (not shown) for converging laser light emitted from the semiconductor laser element on the data recording medium 201 is constructed to move in two-axial directions according to an output current of the object glass actuator driving circuit 218. The object glass moves in a vertical direction with respect to the data recording medium 201 for correction of the focus deviation and moves in a radial direction of the data recording medium 201 for correction of the track deviation.

A moving mechanism (not shown) of the object glass is called an object glass actuator. The following structures are often used to implement the object glass actuator structure.

[Axial Sliding System]

The Axial Sliding System is a system in which a blade integrally formed with the object glass is moved along the central axis (shaft). The blade is moved in a direction along the central axis to correct the focus deviation, and the blade is rotated with the central axis set as a center to correct the track deviation.

[Four Wire System]

The Four Wire System is a system in which a blade integrally formed with the object glass is connected to a fixed system via four wires, and the blade is moved in two axial directions by use of elastic deformation of the wires.

In each of the above systems, a permanent magnet and a coil are used, and the blade is moved by passing a current in the coil connected to the blade.

<<Rotation Control System of Data Recording Medium 201>>

The data recording medium (optical disk) 201 is loaded on a rotation table 221 that is rotated by a driving force of a spindle motor 204.

The rotation speed of the data recording medium 201 is detected by a reproduced signal obtained from the data recording medium 201. The detection analog signal output from amplifier 213 is converted into a digital signal by binarizing circuit 212. A reference clock signal of constant period is generated from a PLL circuit 211 based on the above digital signal. A data recording medium rotation speed detecting circuit 214 detects the rotation speed of the data recording medium 201 by using the above digital signal and outputs its value.

A correspondence table of the data recording medium rotation speed, corresponding to the radial position in which the reproducing operation or the recording/deleting operation is effected on the data recording medium 201, is previously recorded in a semiconductor memory 219. If the reproducing position or the recording/deleting position is determined, a controller section 220 refers to data of the semiconductor memory 219 to set a target rotation speed of the data recording medium 201 and notifies the value to a spindle motor driving circuit 215.

In the spindle motor driving circuit 215, a difference between the target rotation speed and an output signal, representing a present rotation speed, of the data recording medium rotation speed detecting circuit 214 is derived. A driving current corresponding to the derived difference is supplied to the spindle motor 204 to control the rotation speed of the spindle motor 204 to a constant value. The output signal of the data recording medium rotation speed detecting circuit 214 is a pulse signal having a frequency corresponding to the rotation speed of the data recording medium 201. Both the frequency and pulse phase of the pulse signal are controlled in the spindle motor driving circuit 215.

<<Optical Head Moving Mechanism>>

The mechanism has an optical head moving mechanism (or forwarding motor) 203 for moving an optical head 202 in a radial direction of the data recording medium 201.

As a guide mechanism for moving the optical head 202, a rod-like guide shaft is used in many cases. In the guide mechanism, the optical head 202 is moved by using friction between the guide shaft and the bush attached to part of the optical head 202. Further, a method using a bearing that reduces the friction force by use of the rotation movement is provided.

Although not shown in the drawing, the driving force transmission method for moving the optical head 202 can be attained by 1) arranging a rotation motor with a pinion (or rotation gear) on the fixed system, 2) arranging a rack that is a linear gear and engages with the pinion on the side surface of the optical head 202 and, 3) converting the rotation movement of the rotation motor into the linear movement of the optical head 202. As the other driving force transmission method, a linear motor system for arranging a permanent magnet on the fixed system and passing a current in the coil disposed on the optical head 202 to move linearly the same in a certain direction may be used in some cases.

In either method using the rotation motor or linear motor, the driving force for moving the optical head 202 is generated by passing a current in the forwarding motor. The driving current is supplied from a motor driving circuit 216.

Functions of Various Control Circuits

<<Convergent Light Spot Tracing Control>>

A circuit for supplying a driving current to an object glass actuator (not shown) in the optical head 202, according to an output (detection) signal of the focus track error detection circuit 217 to correct the focus deviation or track deviation, is the object glass actuator driving circuit 218. The driving circuit 218 contains a phase compensation circuit that improves the frequency characteristic of the object glass actuator to make the object glass movement responsive at high speed up to the high frequency range.

In the object glass actuator driving circuit 218, the following processes are effected in response to an instruction from the controller section 220.

(a) The ON/OFF process of the focus/track deviation correcting operation (or focus/track loop)

(b) The process (effected at the OFF time of the focus/track loop) for moving the object glass in the vertical (focus) direction of the data recording medium 201 at low speed (c) The process for slightly moving the object glass in the radial direction (across the track) of the data recording medium 201 by using a kick pulse to move the convergent light spot to the adjacent track.

<Switching Operation between Reproducing Process and Recording/Deleting Process>

The operation of switching between the reproducing process and the recording/deleting process occurs by changing the light amount of the convergent light spot applied on the data recording medium 201.

Generally, the following expression (1) holds for the data recording medium using the phase variation system.

$$[\text{light amount at recording time}] > [\text{light amount at deleting time}] > [\text{light amount at reproducing time}] \qquad (1)$$

The following expression (2) generally holds for the data recording medium using the photo-electromagnetic system.

$$[\text{light amount at recording time}][\text{light amount at deleting time}] > [\text{light amount at reproducing time}] \qquad (2).$$

For a photo-electromagnetic system, the recording and deleting processes are controlled by changing the polarity of the external magnetic field (not shown) applied to the data recording medium 201 at the recording/deleting time.

At the data reproducing time, a constant amount of light is applied continuously to the data recording medium 201.

When new data is recorded, an amount of intermittent pulse-like light is superposed on the light amount applied at the reproducing time. When the semiconductor laser element emits a pulse with a large amount of light, the light reflective recording film of the data recording medium 201 locally causes an optical variation or a variation in the shape to form a recording mark. Also, when data is overwritten on the area where data is already recorded, a pulse is emitted from the semiconductor laser element.

Data that is written already is deleted, and a constant amount of light larger than that applied at the reproducing time is applied continuously. When data is deleted continuously, the amount of applied light is returned to that of the reproducing time for each specified period, for each sector unit to reproduce intermittently data in parallel with the deleting process. Thus, the deleting process is effected while confirming that the deleting track is not erroneous by intermittently reproducing the track number and address of the track to be deleted.

<Laser Light Emission Control>

Although not shown in the drawing, a photodetector that detects the emission light amount of the semiconductor laser element is contained in the optical head 202. In the semiconductor laser driving circuit 205, a difference between the photodetector output (the detection signal of emission light amount of the semiconductor laser element) and an emission light reference signal supplied from a record/reproduce/delete control phase generating circuit 206 is derived and the feedback control of the driving current to the semiconductor laser occurs based on the derived difference.

Various Operations Relating to Control System of Mechanical Portion

<<Start Control>>

When the data recording medium (or optical disk) 201 is loaded on the rotation table 221 and the start control is started, the following procedures occur.

(1) A target rotation speed is notified from the controller section 220 to the spindle motor driving circuit 215, and a driving current is supplied from spindle motor 215 to spindle motor 204 to begin rotation of spindle motor 204.

(2) Concurrently, a command execution instruction is issued from controller section 220 to the forwarding motor driving circuit 216. A driving current is supplied from the forwarding motor driving circuit 216 to the optical head driving mechanism (or forwarding motor) 203 to move the optical head 202 to the innermost position of the data recording medium 201. As a result, it is confirmed that the optical head 202 lies on the inner portion located inwardly from the area in which data of the data recording medium 201 is recorded.

(3) When the rotation speed of the spindle motor 204 reaches the target rotation speed, the status (in the form of a status report) is issued to the controller section 220.

(4) A current is supplied from the semiconductor laser driving circuit 205 to the semiconductor laser element in the optical head 202 according to the reproducing light amount signal supplied from the controller section 220 to the record/reproduce/delete control phase generating circuit 206 to start the laser light emission process.

The optimum application light amounts differ depending on the types of the data recording media (or optical disks) 201. At the starting time, a current supplied to the semiconductor laser element is set to a value corresponding to the smallest one of the application light amounts.

(5) The object glass (not shown) in the optical head 202 is set in the farthest position from the data recording medium 201, according to the command from the controller section 220. Then the object glass actuator driving circuit 218 controls the object glass to move slowly the object glass towards the data recording medium 201.

(6) Concurrently, the focus deviation amount is monitored in the focus track error detection circuit 217, and when the object glass comes near a focused position, the status is issued to notify to the controller section 220 that "the object glass comes near the focused position."

(7) If the controller section 220 receives the status, it issues a command to the object glass actuator driving circuit 218 to set the focus loop ON.

(8) The controller section 220 issues a command to the forwarding motor driving circuit 216 with the focus loop kept ON to slowly move the optical head 202 in the outer peripheral direction of the data recording medium 201.

(9) Concurrently, a reproduced signal from optical head 202 is monitored. When the optical head 202 comes to the recording area of the data recording medium 201, the movement of the optical head 202 is stopped, and it issues a command to the object glass actuator driving circuit 218 so as to set the track loop ON.

(10) Then, "the optimum light amount at the reproducing time" and "the optimum light amount at the recording/deleting time" recorded in the inner portion of the data recording medium (or optical disk) 201 are reproduced. The data items are stored into the semiconductor memory 219 via the controller section 220.

(11) Further, in the controller section 220, a signal corresponding to "the optimum light amount at the reproducing time" is supplied to the record/reproduce/delete control phase generating circuit 206 to set the light emission amount of the semiconductor laser element at the reproducing time again.

(12) Then, the light emission amount of the semiconductor laser element at the recording/deleting time is set according to "the optimum light amount at the recording/deleting time" recorded in the data recording medium 201.

<<Access Control>>

Data indicating the location of the reproducing data recording medium 201, in which access destination data recorded on the data recording medium 201 is recorded and indicating its contents, differs according to the type of the data recording medium 201. For example, in a DVD disk, the data is recorded in the navigation pack or the directory management area of the data recording medium 201.

Generally, the directory management area is recorded collectively in the inner peripheral area or outer peripheral area of the data recording medium 201. Further, the navigation pack is contained in a data unit that is a VOBU (Video Object Unit) in a VOBS (Video Object Set), corresponding to the data structure of PS (Program Stream) of MPEG and data indicating the recording location of a next video image is recorded therein.

When specified data is reproduced or recorded/deleted, data in the directory management area is reproduced first, and the access destination is determined based on the data thus obtained.

<Rough Access Control>

The radial position of the access destination is derived by calculations in the controller section 220 to derive a distance with respect to the present position of the optical head 202.

Speed curve data for permitting the optical head 202 to travel the distance in the shortest time is stored previously in the semiconductor memory 219. The controller section 220 reads out the data and controls the movement of the optical head 202 in the following manner according to the speed curve.

That is, the controller section 220 issues a command to the object glass actuator driving circuit 218 to set the track loop OFF and then controls the forwarding motor driving circuit 216 to start the movement of the optical head 202.

When the convergent light spot crosses the track on the data recording medium 201, a track error detection signal is generated in the focus track error detecting circuit 217. The relative speed of the convergent light spot with respect to the data recording medium 201 can be detected by use of the track error detection signal.

In the forwarding motor driving circuit 216, a difference, between the relative speed of the convergent light spot obtained from the focus track error detecting circuit 217 and the target speed data sequentially supplied from the controller section 220 is derived. The forwarding motor driving circuit 216 moves the optical head 202, while effecting the feedback control on a driving current that is supplied to the optical head driving mechanism (forwarding motor) 203 based on the derived difference.

As described previously, friction force always acts between the guide shaft and the bush or bearing. Dynamical friction acts while the optical head 202 moves at high speed, but static friction occurs at the time of starting of the movement or immediately before stoppage because the optical head 202 moves slowly. When the static friction occurs (particularly, immediately before stoppage), the friction force relatively increases. In order to cope with increases in the friction force, the amplification factor (or gain) of the control system is increased by a command from the controller section 220 to increase a current supplied to the optical head driving mechanism (or forwarding motor) 203.

<Fine Access Control>

When the optical head 202 reaches the target position, the controller section 220 issues a command to the object glass driving circuit 218 to set the track loop ON.

The convergent light spot is traced along the track on the data recording medium 201 to reproduce the address or track number of the traced portion.

The present position of the convergent light spot is derived based on the address or track number of the traced portion. The number of tracks different from the target position is calculated by the controller section 220. The number of tracks necessary for movement of the convergent light spot is communicated to the object glass actuator driving circuit 218.

If one set of kick pulses are generated in the object glass actuator driving circuit 218, the object glass slightly moves in the radial direction of the data recording medium 201, and the convergent light spot moves to the adjacent track.

In the object glass actuator driving circuit 218, the track loop is temporarily set OFF, kick pulses of a number corresponding to data from the controller section 220 are generated, and the track loop subsequently is set ON again.

After completion of the fine access control, the controller section 220 reproduces data (such as address or track number) in a position traced by the convergent light spot and confirms that the target track is being accessed.

<<Continuous Recording/Reproducing/Deleting Control>>

Figure 13:
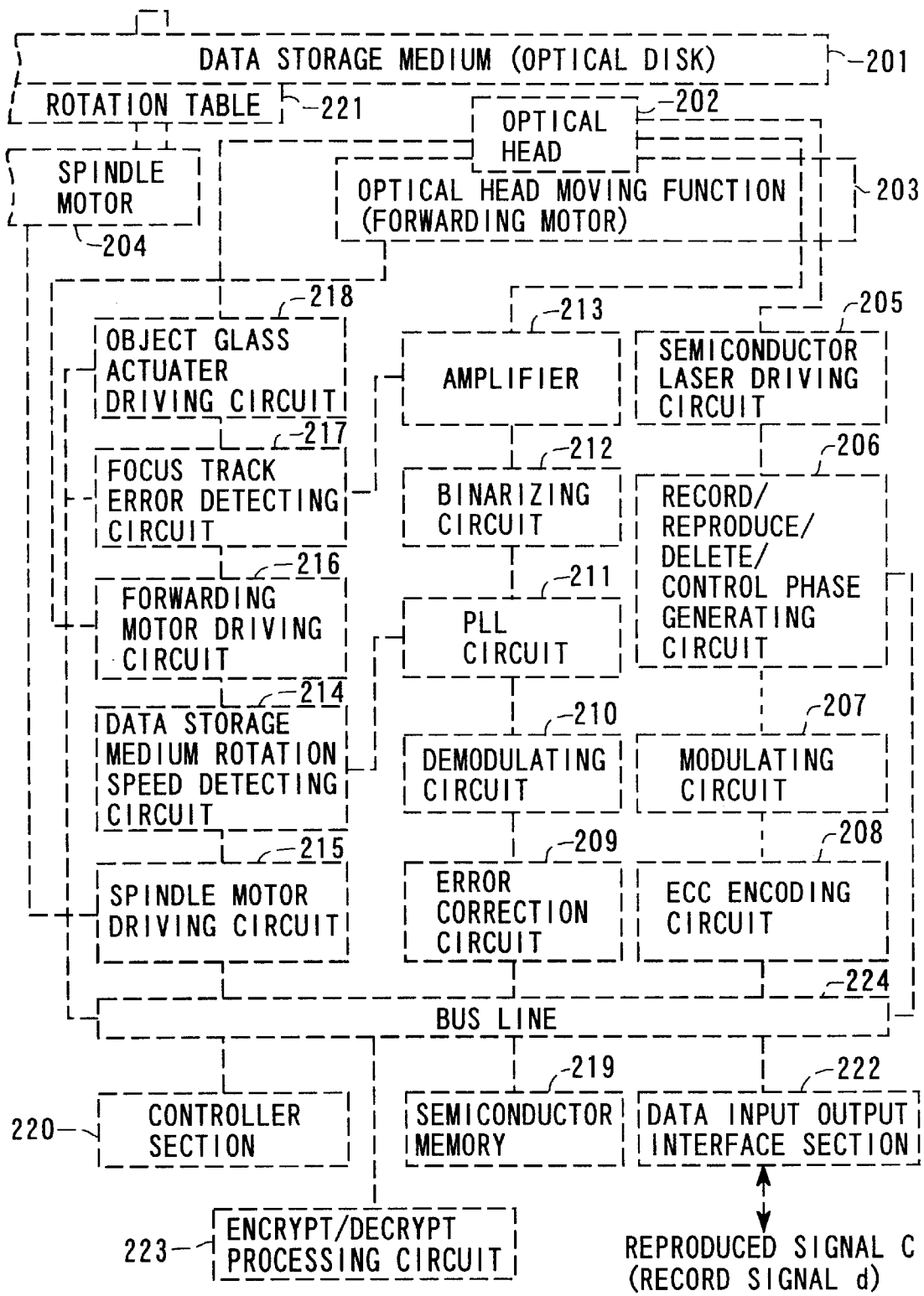
FIG. 13 is a block diagram that illustrates the construction of a disk recording/reproducing apparatus according to an embodiment of the invention.

As shown in FIG. 13, a track error detection signal output from the focus track error detecting circuit 217 is input to the forwarding motor driving circuit 216. At the "starting control time" and "access control time" described above, the controller section 220 controls the forwarding motor driving circuit 216 to prevent using the track error detection signal.

After it is confirmed that the convergent light spot reaches the target track by the access, part of the track error detection signal is supplied as a driving current to the optical head driving mechanism (or forwarding motor) 203 via the motor driving circuit 216 according to a command from the controller section 220. In a period during which the reproduction or recording/deleting process is effected continuously, the above control operation is effected continuously.

The data recording medium 201 is mounted on the rotation table 221 with its central position being slightly eccentrically set with respect to the central position of the rotation table 221. When part of the track error detection signal is supplied as the driving current, the whole portion of the optical head 202 slightly vibrates according to the eccentricity.

Further, if the reproduction or recording/deleting process is effected continuously for a long time, the convergent light spot gradually moves in the outer or inner peripheral direction. When part of the track error detection signal is supplied as a driving current to the optical head moving mechanism (or forwarding motor) 203, the optical head 202 gradually moves in the outer or inner peripheral direction.

Thus, the track loop can be stabilized by alleviating the load due to track deviation correction of the object glass actuator.

<<Termination Control>>

When a sequence of processes are completed and the operation is terminated, the process occurs according to the following procedure.

(1) A command for setting the track loop OFF is issued from the controller section 220 to the object glass actuator driving circuit 218.

(2) A command for setting the focus loop OFF is issued from the controller section 220 to the object glass actuator driving circuit 218.

(3) A command for terminating the light emission operation of the semiconductor laser element is issued from the controller section 220 to the record/reproduce/delete control phase generating circuit 206.

(4) The spindle motor driving circuit 215 is notified that "0" is a reference rotation speed.

Flow of Recording Signal/Reproducing Signal to Data

<<Flow of Signal at Reproducing Time>>

<Binary-Coding/PLL Circuit>

As described in the previous section <Signal Detection by Optical Head 202>, a variation in the amount of reflected light from the light reflection film or light reflective recording film of the data recording medium (or optical disk) 201 is detected to reproduce a signal on the data recording medium 201. A signal obtained by the amplifier 213 has an analog waveform. The binarizing circuit 212 uses a comparator to convert the analog signal to a binary digital signal of "1" and "0".

A reference signal at the time of data reproduction is derived from the reproduced signal obtained by the binarizing circuit 212 in the PLL circuit 211. That is, the PLL circuit 211 contains a frequency variable oscillator and compares the frequencies and phases between the pulse signal (or reference clock) output from the oscillator and the output signal of the binarizing circuit 212. The result of comparison is fed back to the oscillator output to produce a reference signal at the time of data reproduction.

<Demodulation of Signal>

A demodulation circuit 210 contains a conversion table indicating the relation between the modulated signal and the signal obtained after demodulation. The demodulation circuit 210 restores an input signal (or modulated signal) into an original signal (or demodulated signal), while referring to the conversion table according to the reference clock obtained in the PLL circuit 211.

Figure 5:
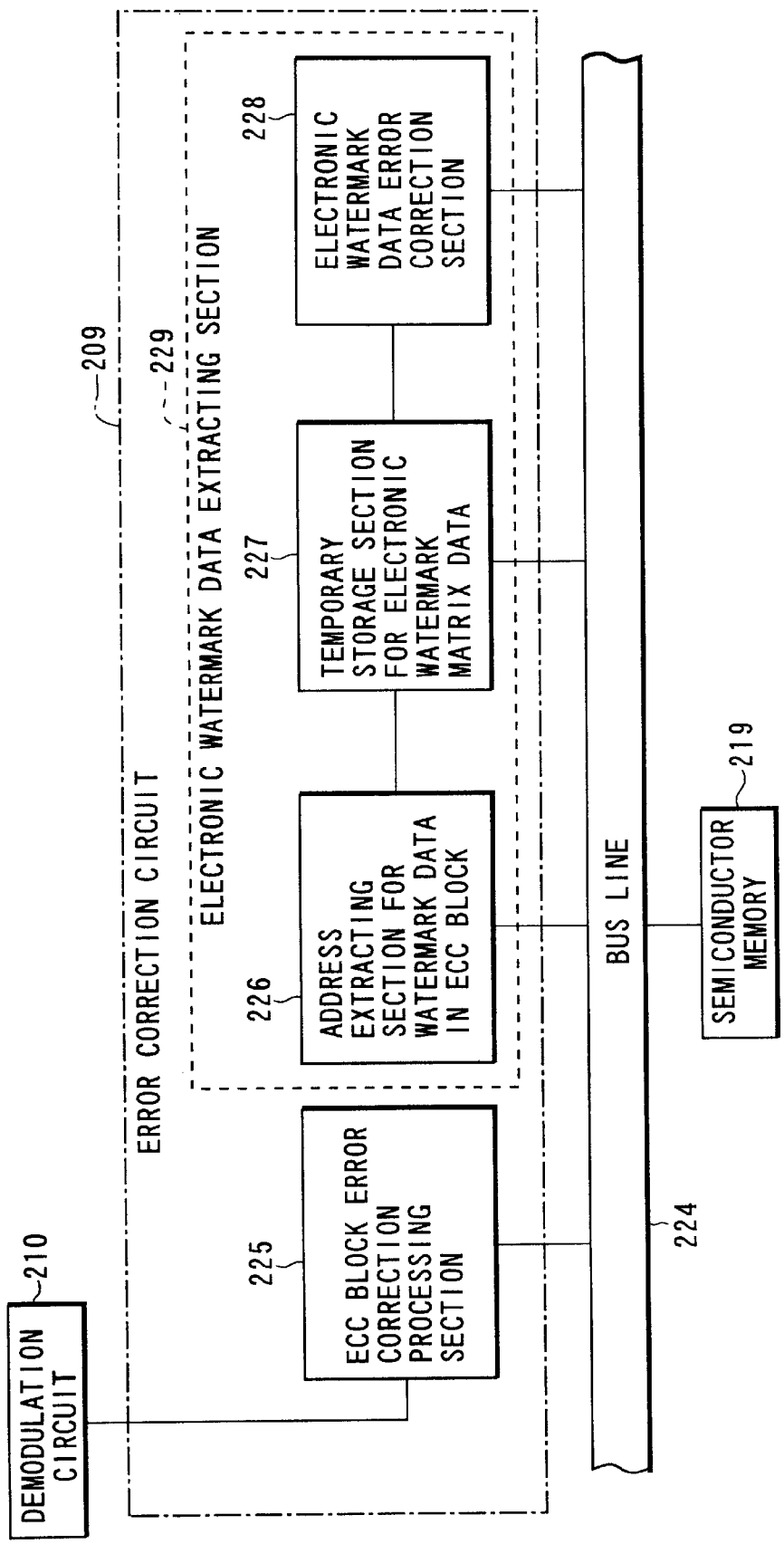
FIG. 5 is a block diagram that shows an error correction circuit and electronic watermark data extracting section according to an embodiment of the invention.

The demodulated signal is stored into the semiconductor memory 219 via a signal line (a signal line directly connecting the demodulation circuit 210 to the bus line 224) on the leftmost position in FIG. 5.

<Error Correction Process>

The internal construction of an error correction circuit 209 is as shown in FIG. 5. That is, the interior of the error correction circuit 209 is roughly divided into an ECC block error correction processing section 225 and an electronic watermark data extracting section 229. Further, the electronic watermark extracting section 229 includes an address extracting section 226 for watermark data in an ECC block, temporary storage section 227 for electronic watermark matrix data, and electronic watermark data error correction section 228.

In the ECC block error correction processing section 225, an error position is detected for a signal stored in the semiconductor memory 219 by use of the inner parity code PI and outer parity code PO, and a pointer flag of the error position is set. After this, a signal in the error position is corrected sequentially according to the error pointer flag while reading out a signal from the semiconductor memory 219. Corrected data is then restored into the semiconductor memory 219.

In a case where data reproduced from the data recording medium 201 is output to the exterior as a reproduced signal C shown in FIG. 13, the inner parity code PI and outer parity code PO are eliminated from error corrected data stored in the semiconductor memory 219. The data obtained from the reproduced signal is transferred to a data input/output interface section 222 via the bus line 224.

Then, the data input/output interface section 222 outputs a signal supplied from the error correction circuit 209 as the reproduced signal C.

<<Signal Format Recorded on Data Recording Medium 201>>

A signal recorded on the data recording medium 201 is required to satisfy the following requirements.

(a) Recorded data error caused by the defect on the data recording medium 201 can be corrected.

(b) A DC component of the reproduced signal is set to "0" to simplify the reproduction processing circuit.

(c) Data can be recorded on the data recording medium 201 with maximum permissible density.

In order to satisfy the above requirements, "addition of the error correction function" and "signal conversion (signal modulation/demodulation) for recorded data" are effected in the disk recording/reproducing section (physical series block) shown in FIG. 13.

<<Signal Flow at Recording Time>>

<Error Correction Code ECC Adding Process>

The error correction code (ECC) adding process is explained with reference to FIG. 6.

Figure 6:
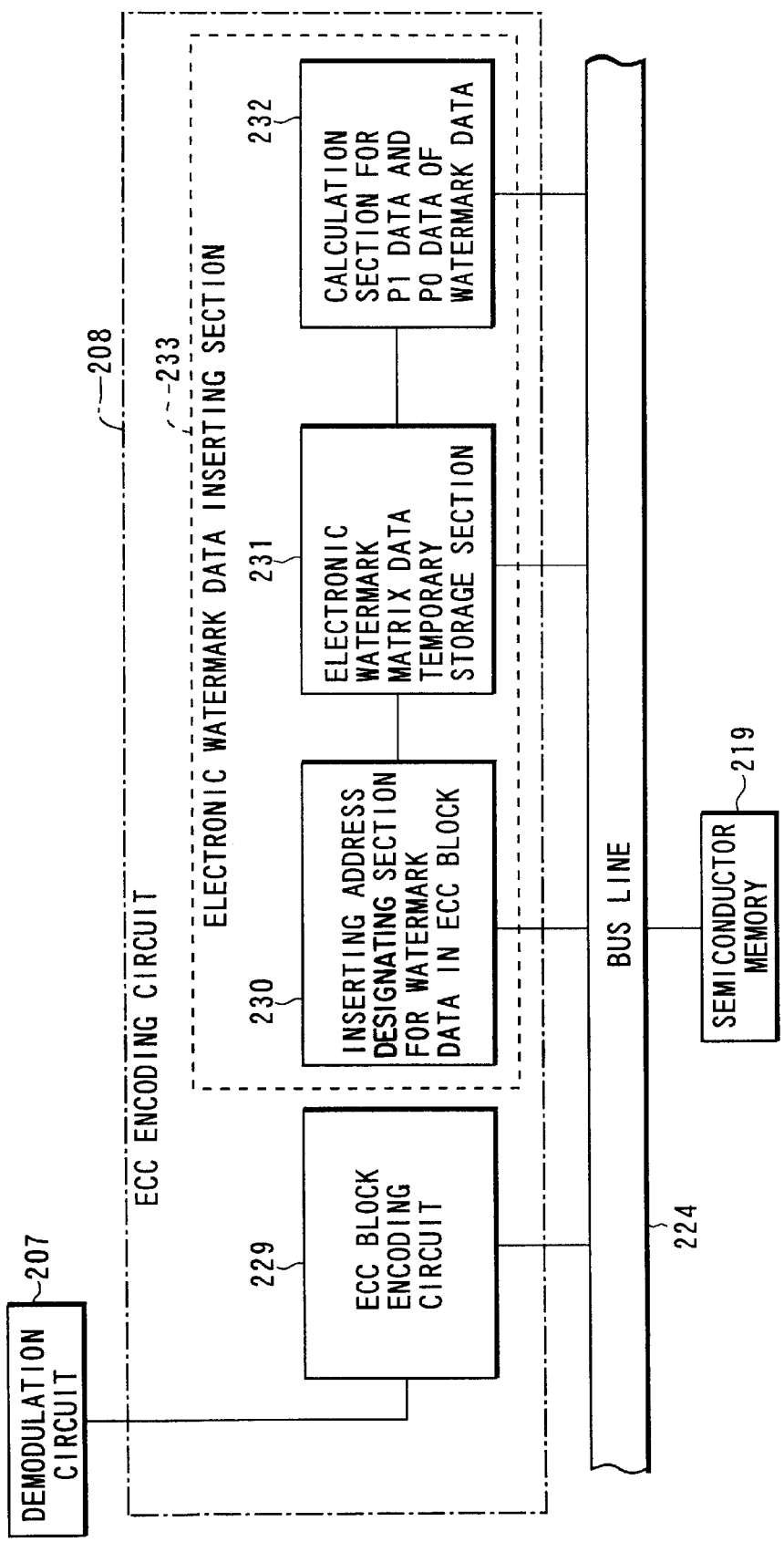
FIG. 6 is a block diagram that shows an ECC block encoding circuit and electronic watermark data inserting section according to an embodiment of the invention.

The internal construction of an ECC encoding circuit 208 is shown in FIG. 6. The ECC encoding circuit 208 includes an ECC block encoding circuit 229 and an electronic watermark data inserting section 233. Further, the electronic watermark data inserting section 233 includes an inserting address designating section 230 for watermark data in an ECC block, an electronic watermark matrix data temporary storage section 231, and a calculation section 232 for PI data and PO data of watermark data.

Data that is to be recorded on the data recording medium 201 is input to the data input/output interface section 222 of FIG. 13 as a recorded signal d in the form of an original signal. The recorded signal d is stored in the semiconductor memory 219 of FIG. 6. After this, the following ECC adding process is effected in the ECC block encoding circuit 229 of the ECC encoding circuit 208.

A concrete example of the ECC adding method using a product code is explained below.

The recorded signal d is arranged sequentially for every 172 bytes for each column in the semiconductor memory 219. One ECC block is formed of 192 columns where a data amount of approximately 32 kilo-bytes can be obtained by 172 bytes (for each column)×192 bytes (for each row).

An inner parity code PI of 10 bytes is calculated for each column of 172 bytes that is calculated for the original signal (or recorded signal d) in one ECC block constructed by "172 bytes (for each column)×192 bytes (for each row)" and stored in semiconductor memory 219. Further, an outer parity code PO of 16 bytes is calculated for each row in the byte unit and stored in the semiconductor memory 219.

The total of 2366 bytes (=(12+1)×(172+10)) of 12 columns (12×(172+10) bytes) including the inner parity code PI of 10 bytes and one column (1×(172+10) bytes) of the outer parity code PO is used as a unit and data subjected to the error correction code ECC adding process is recorded in one sector of the data recording medium 201.

The ECC block encoding circuit 229 of the ECC encoding circuit 208 transfers data to the semiconductor memory 219 when addition of the inner parity code PI and outer parity code PO is completed.

When data is recorded on the data recording medium 201, a signal of every 2366 bytes of one sector is transferred from the semiconductor memory 219 to demodulation circuit 207 via a signal line that directly connects the bus line 224 to the demodulation circuit 207.

<Signal Modulation>

Signal demodulation, being the conversion of a signal format, is effected in the demodulation circuit 207 to set a DC component (DSV: Digital Sum Value or Digital Sum Variation) of the reproduced signal closer to "0" and record data on the data recording medium 201 at high density.

The modulating circuit 207 and demodulating circuit 210 of FIG. 13 respectively contain conversion tables indicating the relation between an original signal and a signal obtained after modulation. The modulating circuit 207 divides a signal transferred from the ECC encoding circuit 208 into portions of a plurality of bits according to a preset modulation system and converts the signal into another signal (code) while referring to the conversion table.

In a case where 8/16 modulation (RLL(2, 10) code) is used as the modulation system, two types of conversion tables are provided and a reference conversion table is selectively used to set the DC component (DSV) obtained after modulation closer to "0".

<Recording Waveform Generation>

When a recording mark is recorded on the data recording medium (optical disk) 201, the following systems are provided for recording.

[Mark Length Recording System] "1" is in the front and rear end positions of the recording mark.

[Intra-Mark Recording System] The central position of the recording mark coincides with the position of "1".

If the mark length recording system is used, it is necessary to form a relatively long recording mark. In this case, if a recording light of a large amount is applied continuously to the data recording medium 201 for a preset period of time or more, the width of only the rear portion of the mark is made larger, due to the heat storage effect of the light reflective recording film of the data recording medium 201, and a recording mark in the form of raindrop is formed. In order to solve this problem, the recording laser driving signal is divided into a plurality of recording pulses or the recording waveform of the recording laser is changed in a stepwise form when a long recording mark is formed.

In the record/reproduce/delete control phase generating circuit 206, a recording waveform is formed, according to the recording signal supplied from the modulating circuit 207. A driving signal having a formed recording waveform is supplied to the semiconductor laser driving circuit 205.

<Insertion of Electronic Watermark Data>

FIGS. 7A and 7B are diagrams showing the contents of electronic watermark data having a parity code.

An example of password data registered by the user and stored in the semiconductor memory 219 is shown in FIG. 7A.

Each of data items a to i in FIG. 7A indicates bit data of "0" or "1". The electronic watermark matrix data temporary storage section 231 shown in FIG. 6 reads out user password data stored in the semiconductor memory 219 and rearranges the one-dimensional password a to i of FIG. 7A into a two-dimensional matrix as shown in FIG. 7B.

In the calculation section 232 for PI data and PO data of watermark data of FIG. 6, a PI4 (Inner Parity Code: error correction inner parity code) and PO7 (Outer Parity Code: error correction outer parity code) are calculated and added to user password data two-dimensionally arranged as shown in FIG. 7B. Thus, bit data items a to p that are completed by adding the error correction inner parity code 4 (j, k, l) and outer parity code 5 (m, n, o, p) are used as the electronic watermark data.

In order to insert the electronic watermark data into the specified position as shown in FIG. 1B, the inserting address designating section 230 for watermark data in the ECC block specifies the inserting position of the electronic watermark data. The inserting address designating section 23 sequentially inserts the electronic watermark data bits of a to p into the ECC block data stored in the semiconductor memory 219.

In the ECC encoding circuit 208 shown in FIG. 6, a method for overwriting the electronic watermark data on the ECC block data that is previously formed is used as a method for inserting the electronic watermark data.

A method other than the above "Overwriting" method can be used as the insertion method of the electronic watermark data. For example, the electronic watermark data can be inserted into the ECC block data by a method using an exclusive OR circuit, for adding original ECC block data and electronic watermark data in units of bits.

Figure 2:
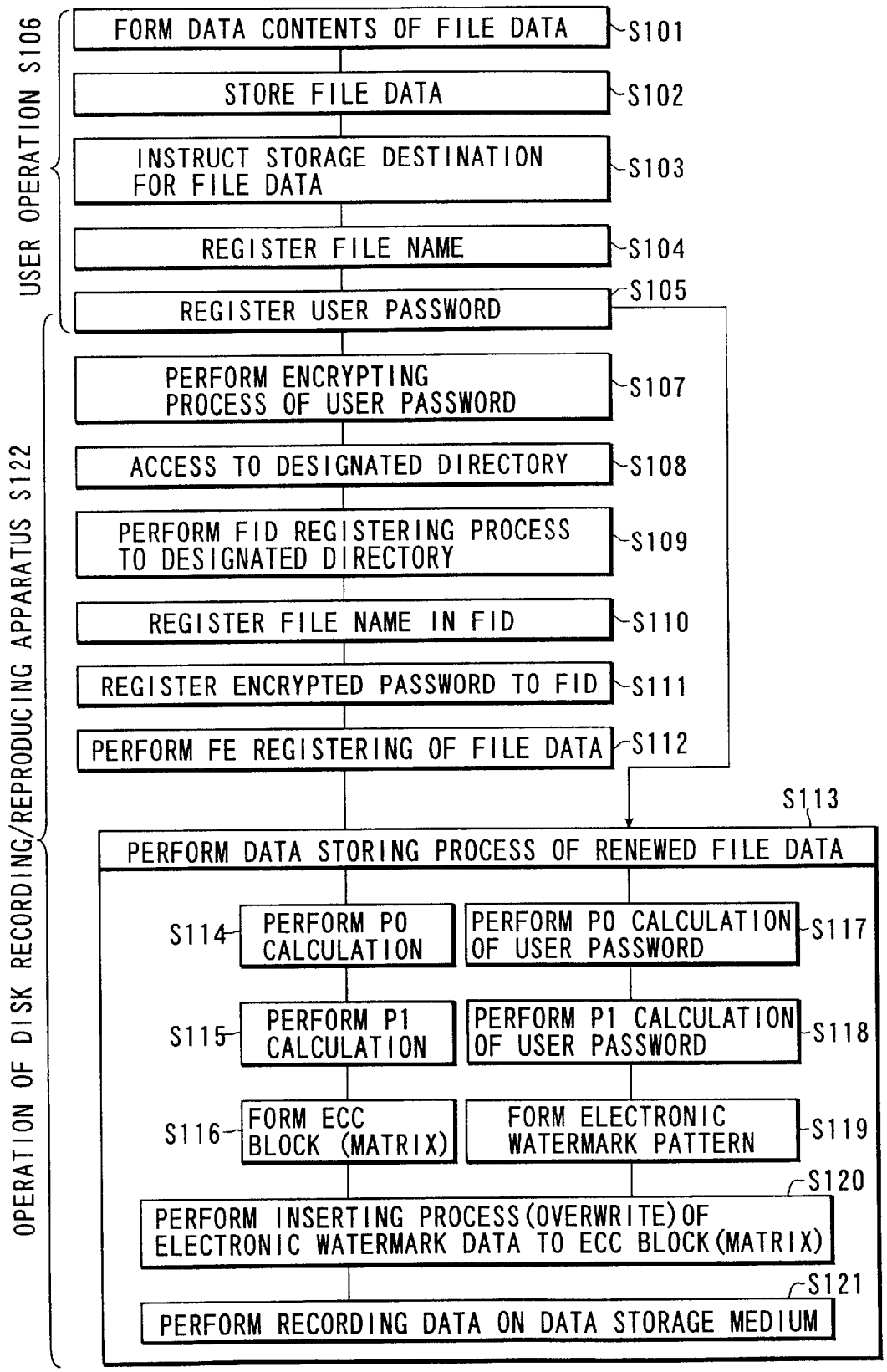
FIG. 2 is a flowchart that illustrates an example of a method for recording data containing an electronic watermark according to an embodiment of the invention.

The process for inserting (or overwriting) the electronic watermark data on the ECC block (or matrix) occurs in step S120 in the flowchart of FIG. 2.

Data obtained after completion of the electronic watermark data insertion process is recorded on the data recording medium (optical disk) 201 via bus line 224, modulation circuit 207, record/reproduce/delete control phase generating circuit 206, semiconductor laser driving circuit 205, and optical head 202.

FIG. 2 is a flowchart that illustrates an example of a method for recording data containing the electronic watermark according to an embodiment of the invention. A method for recording data that a user forms, which is protected by copyright needing a copy protection on the data recording medium, is explained with reference to the flowchart. The process of the flowchart is implemented by a micro-computer (CPU or MPU) contained in the controller section 220 of FIG. 13.

After the user forms data contents of file data (S101), the file data is stored (S102). As part of the storage process directed by the user, a process (S103) for designating the storage location (one of the directories under which data is stored) of file data, a process (S104) for registering the file name of the storage file, and a process (S105) for registering the user password are effected. For data that requires copy protection, the prevention of dishonest copying is effected by use of a registered user password.

Figure 3:
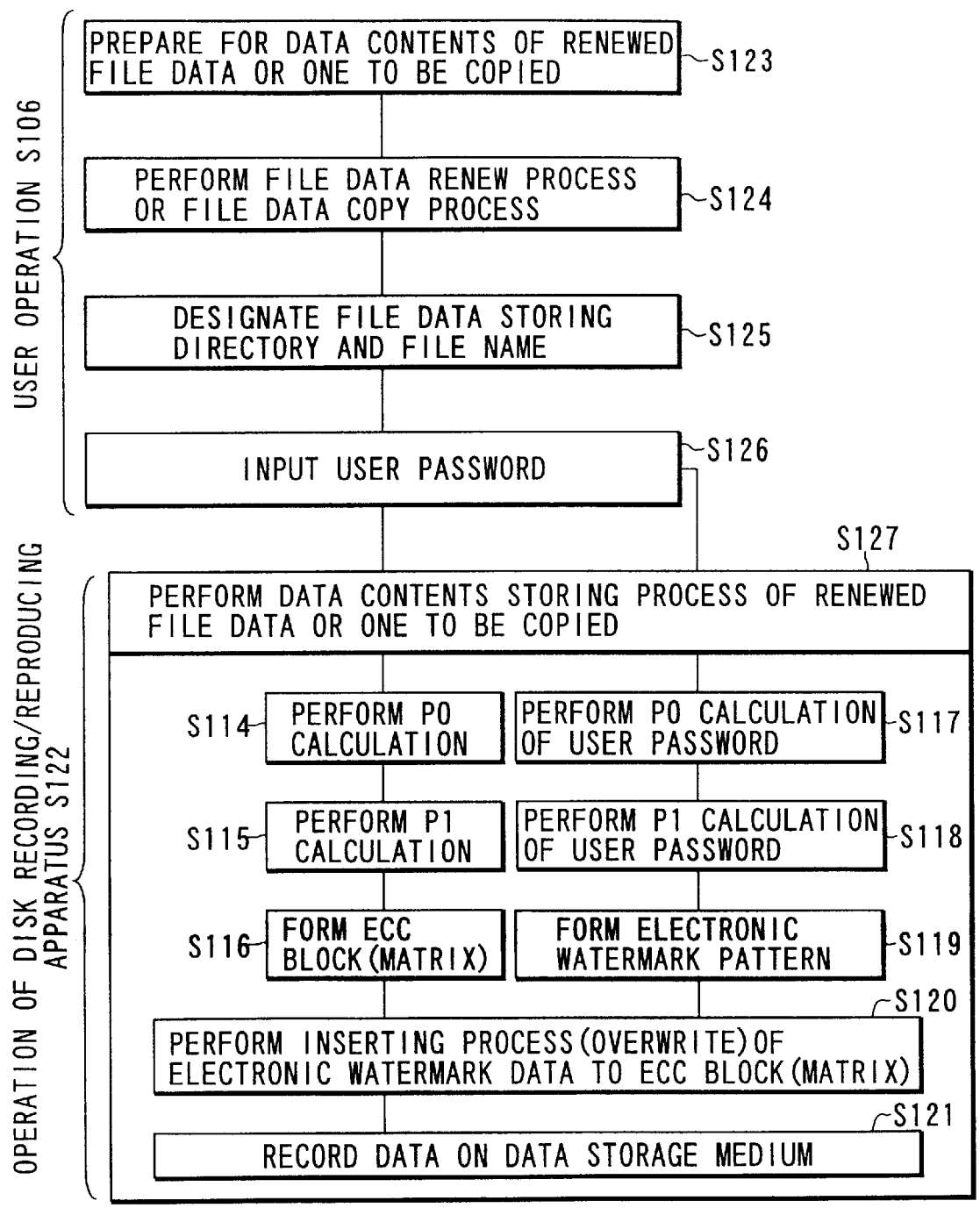
FIG. 3 is a flowchart that illustrates another example of a method for recording data containing an electronic watermark according to an embodiment of the invention.

The above sequence of processes (S106) are the operations performed by the user. The disk recording/reproducing apparatus receives data obtained by the user operations S106 and effects the operation of disk recording/reproducing as shown in FIG. 3 (S122).

The password data registered by the user is stored in semiconductor memory 219 of FIG. 13. When encrypting the user password, an encrypt/decrypt processing circuit 223 shown in FIG. 13 reads out the password from the semiconductor memory 219 and performs the encrypting process (S107).

The encrypted password is restored in semiconductor memory 219. The optical head moving mechanism (or forwarding motor) 203 then moves optical head 202 to access the storage location (or sector position on the data recording medium where the directory is stored), designated by the user (S108).

In a case where a DVD-RAM drive is used as the disk recording/reproducing apparatus, a file format called UDF, described later, is used for the file management. In the UDF format, a file name in the file management area is recorded in a file identifier descriptor (FID) also described later.

In FIG. 2, when effecting the FID registering process S109 to a designated directory, the encrypted user password is read out from the semiconductor memory 219 and recorded into the file identifier descriptor FID (S111) after the step of registering the file name in the file identifier descriptor FID (S110).

After this, file data is FE-registered (described later) (S112) and the step of performing data contents storing process of renewed file data (S113) is performed.

In the data contents storing process (S113), the storing process is effected according to the procedure described in the item <Error Correction Code ECC Adding Process>. That is, the outer parity code PO calculation process (S114), inner parity code PI calculation process (S115), and the process for forming an ECC block (matrix) (S116) are performed and the results are stored in semiconductor memory 219 (S120).

Further, when the user password is registered in the user password registering process (S105), the process for calculating the outer parity code PO (PO5 in FIG. 7B) of the user password (S117), the process for calculating the inner parity code PI (PI4 in FIG. 7B) of the user password, and the process for forming an electronic watermark pattern (electronic watermark data a to p) (S119) corresponding to the registered user password are performed in the data contents storing process (S113).

The electronic watermark data (a to p) is inserted as shown in FIG. 1 by the insertion (overwriting) of electronic watermark data on the ECC block (matrix) process (S120).

Thus, data having a copy protecting password (being electronic watermark data formed in the electronic watermark pattern forming process S119) formed in the ECC block forming process S116 that needs to be protected from dishonest copying is recorded on the data recording medium (such as a DVD-RAM disk) 201 in step (S121).

FIG. 3 is a flowchart that illustrates a processing method performed in a situation where file data recorded on the data recording medium 201 according to the method explained in FIG. 2 is renewed.

The user operation (S106) of FIG. 3 is the same operation as user operation (S106) in FIG. 2, except that a file data name is selected versus specifying the file data name.

In FIG. 3, when a data renewing process is performed, the process for registering the encrypted password into the file identifier descriptor FID of FIG. 2 (S111) is not performed. That is, the password used when file data is first recorded is stored continuously in the file identifier descriptor FID.

At the time of data renewing, the password of a person who has renewed data is recorded in the electronic watermark data according to the flowchart of FIG. 3. Accordingly, if a person who first records the file data is different from a person who renews the data, the user password in the file identifier descriptor FID and the password in the electronic watermark data will be different.

When reproducing data from the data recording medium, both the user password in the file identifier descriptor FID and the password in the electronic watermark data are read out and compared to each other. This process determines whether a third party has renewed the file data.

The process is performed according to the procedure of FIG. 3 when file data previously formed is copied on a data recording medium.

If data containing the electronic watermark data is copied dishonestly, the user password of a person who has formed original file data is recorded on the data recording medium 201 of copy destination and the user password of a person who has copied is recorded in the electronic watermark data. Therefore, by comparing the two passwords, dishonest copying can easily be detected.

In a case where a copy is made directly between data recording media without effecting the correct user operation (S106) described in the above example, dishonest copying can be detected. That is, when direct copying is performed, information transferred at the time of copying is subjected to an error correction process and electronic watermark data is eliminated. The "data having the electronic watermark data eliminated therefrom" is transferred to the copying destination. As a result, data transferred to the dishonest copying destination contains no electronic watermark data, and dishonestly copied data can be detected easily by the electronic watermark data extracting process at the time of data reproduction.

Figure 4:
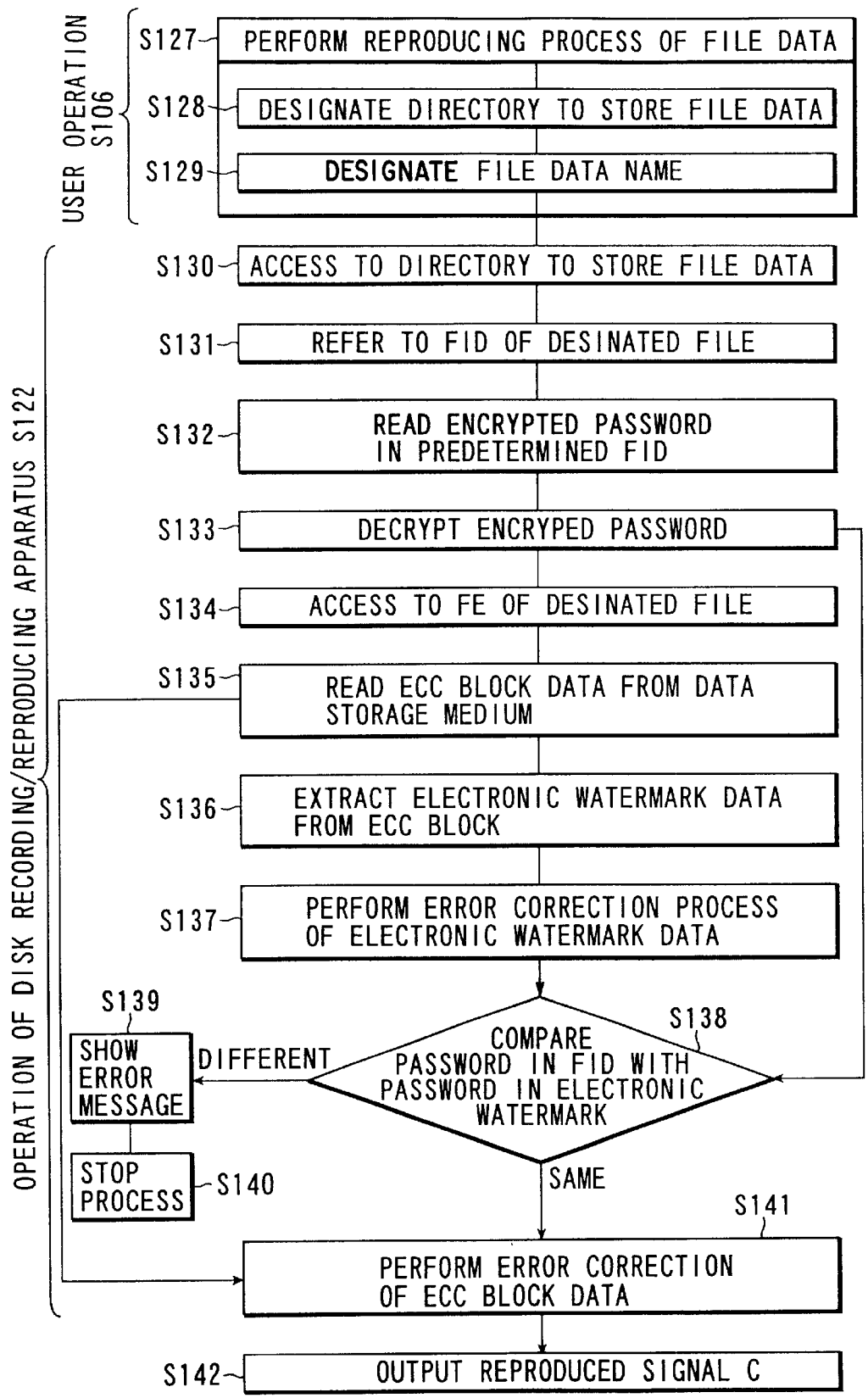
FIG. 4 is a flowchart that illustrates an example of a method for reproducing data containing an electronic watermark (password) according to an embodiment of the invention.

FIG. 4 is a flowchart that illustrates an example of a method for reproducing data containing an electronic watermark (password) according to an embodiment of the invention.

When recorded data is reproduced from the data recording medium 201, a file data reproducing process (S127), a file data storage location (directory) designating process (S128), and a to-be-reproduced file data name designating process (S129) are performed in user operation (S106).

In an operation of the disk recording/reproducing apparatus (S122), a file data storage location (directory) accessing process (S130) and a file identifier descriptor FID searching process (S131) are performed. A process for reading an encrypted password in the file identifier descriptor FID (S132) is then performed.

In the encrypt/decrypt processing circuit 223 of FIG. 13, an encrypted password decrypting process (S133) is performed. A process for accessing file entry of the designated file (S134) is then performed.

In the encrypt/decrypt processing circuit 223, the decrypted password is stored in semiconductor memory 219. A process for reading out ECC block data from the data recording medium 201 (S135) is performed, and the readout ECC block data is stored in semiconductor memory 219.

The position and arrangement order of electronic watermark data inserted in the ECC block are known as indicated by the example of FIG. 1B.

In FIG. 4, a process for extracting electronic watermark data from the ECC block (S136) is performed by the address extracting section for watermark data in the ECC block 226 shown in FIG. 5. The address extracting section for watermark data in the ECC block 226 extracts only electronic watermark data from semiconductor memory 219 and arranges the electronic watermark data as shown in FIG. 7B in the temporary storage section for electronic watermark matrix data 227 shown in FIG. 5.

An error correction process for electronic watermark data (S137) shown in FIG. 4 is performed by electronic watermark data error correction section 228 of FIG. 5. The electronic watermark data error correction section 228 effects the error correcting process by using the PI (inner parity code) 4 and PO (outer parity code) 5 and stores the result of correction into semiconductor memory 219.

In FIG. 4, a process for comparing the password in the file identifier descriptor FID and the password in the electronic watermark data (S138) is performed by the controller section 220 of FIG. 13. The controller section 220 reads out the user password recorded in the file identifier descriptor FID and the user password in the electronic watermark data from semiconductor memory 219 and compares the readout passwords. If the compared passwords are different from each other, an error message indicating the data is copied dishonestly or dishonestly renewed is shown (S139), and the reproduction process is interrupted (S140).

If the compared passwords are the same, the error correction process for the data contents of ECC block data is performed (S141) in the ECC block error correction processing section 225 of FIG. 5. The resultant data is then output as a reproduced signal C (S142).

The error correction circuit 209 in FIG. 5 has a structure suitable for extraction of electronic watermark data when the inserting location of the electronic watermark data in the ECC block is known.

As a method for extracting electronic watermark data when the inserting location of the electronic watermark data in the ECC block is not known, a method for extracting electronic watermark data by extracting an error portion in the ECC block data in the ECC block error correction processing section 225 in FIG. 5 may be used. An electronic bit inserted into the ECC block is recognized as an error when it is reproduced in recorded data and is subjected to the error correction process. Therefore, electronic watermark data can be extracted by collecting the contents of the positions of bits that are recognized as errors in the ECC block.

As shown in FIG. 1B, if the insertion location of the electronic watermark data in the ECC block is always fixed, a third party may extract the electronic watermark data, alter it, and break through the copying protection. Therefore, the insertion location of the electronic watermark data in the ECC block of the present invention is changed periodically to prevent breaking through the copy protection.

An embodiment of the invention has been explained in detail for the medium and recording/reproducing apparatus with reference to the accompanying drawings.

Further, another embodiment of the invention is explained in detail below for the medium and recording/reproducing apparatus with reference to the accompanying drawings.

Another embodiment of the invention features that the electronic watermark in the ECC block is not based on the data contents of the electronic watermark data, but instead is based on an inserting position that indicates a position where the electronic watermark is inserted in the ECC block and the pattern in which the electronic watermark is distributed.

Figure 9:
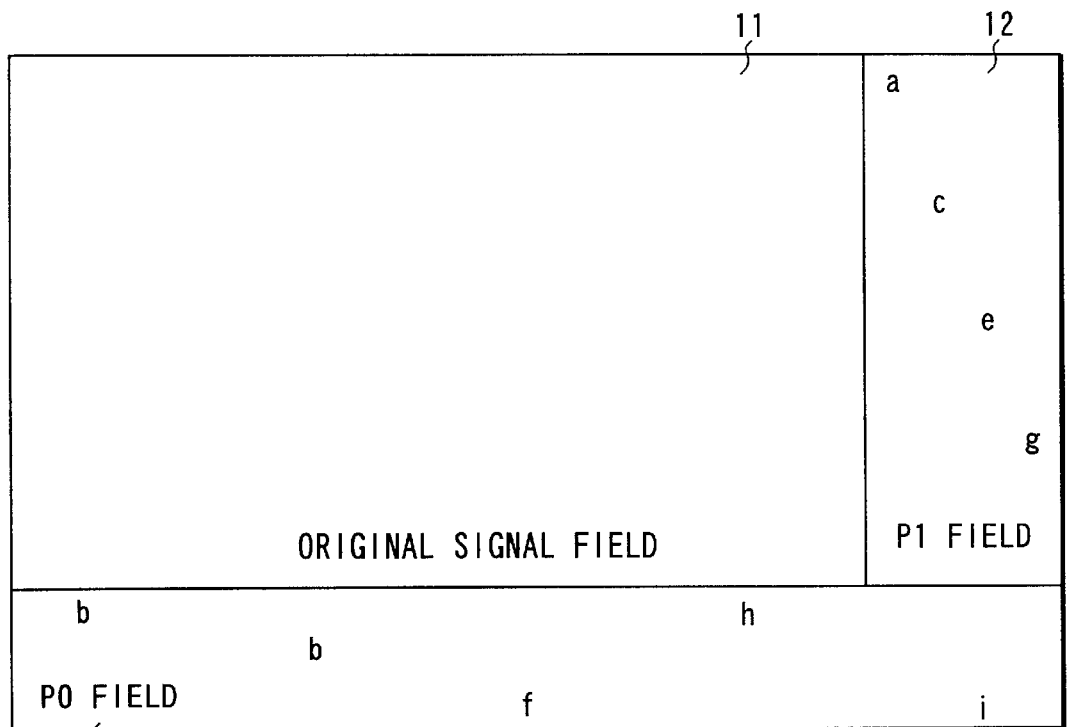
FIG. 9 is a diagram that shows another example in which the position of electronic watermark data inserted in the ECC block according to another embodiment of the invention is changed.
Figure 10:
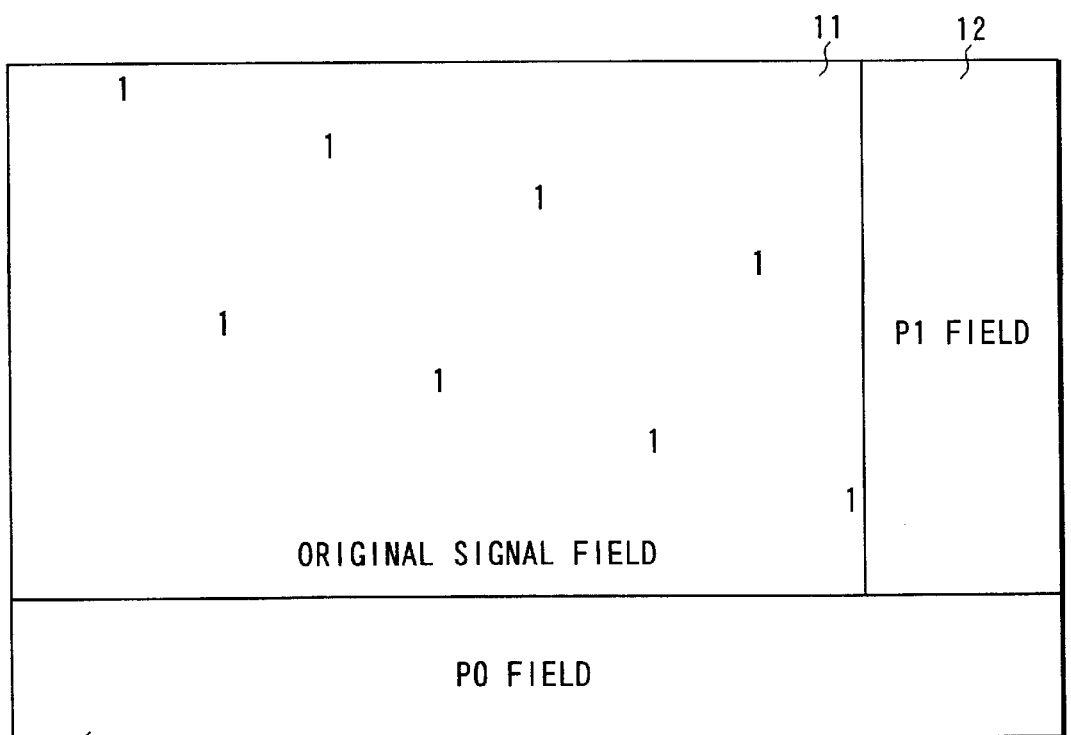
FIG. 10 is a diagram that illustrates a pattern (pattern A) of electronic watermark data inserted in the ECC block according to another embodiment of the invention.
Figure 11:
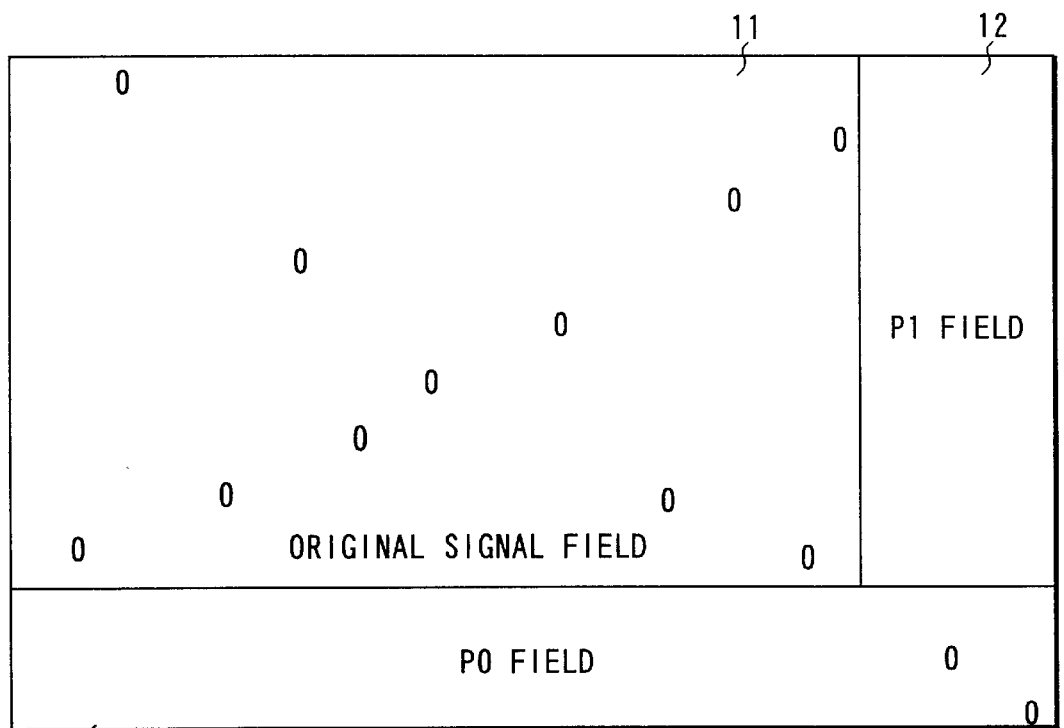
FIG. 11 is a diagram that illustrates a pattern (pattern B) of electronic watermark data inserted in the ECC block according to another embodiment of the invention.
Figure 12:
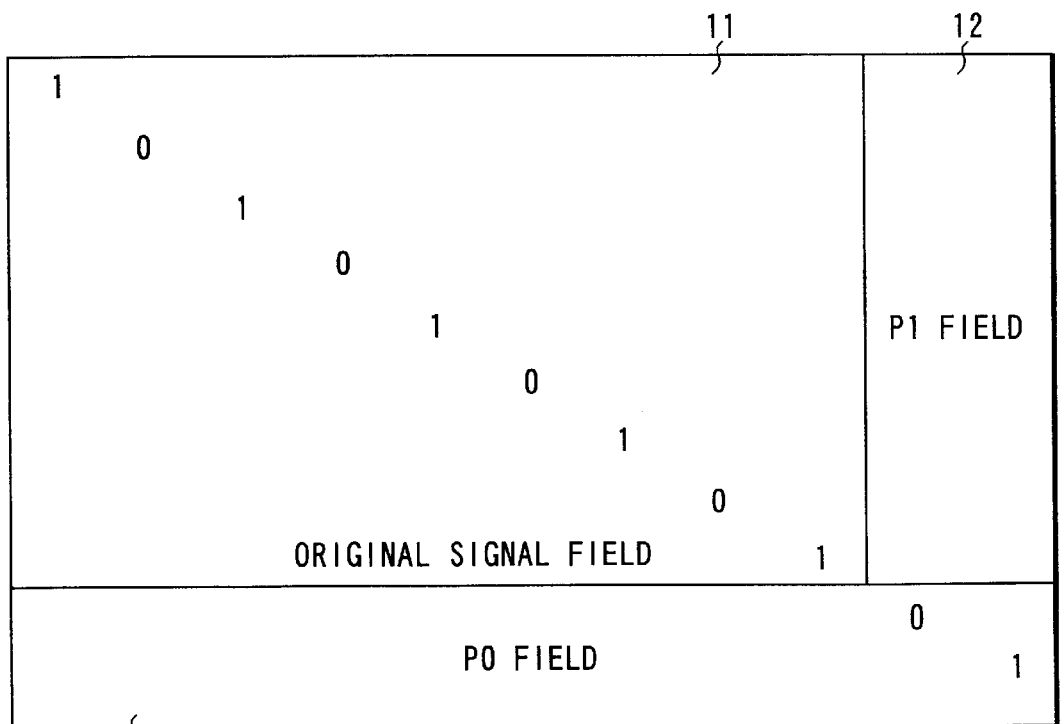
FIG. 12 is a diagram that illustrates a pattern (pattern C) of electronic watermark data inserted in the ECC block according to another embodiment of the invention.

As shown in FIGS. 10, 11, and 12, the content (being combinations of "0" and "1") of the electronic watermark data has no meaning as an electronic watermark and only the inserting position of the electronic watermark has meaning. As shown in FIGS. 8 and 9, the patterns of the electronic watermark inserting positions are expressed by symbols (for example, patterns a, b, c). The symbols (a, b, c) are recorded in the file identifier descriptor FID. Then, dishonest copying is detected by comparing the pattern detected at ECC decoding time and the pattern recorded in the FID.

In the case of the pattern of FIG. 10, data in the extracted electronic watermark data from an inserting position is checked to detect electronic watermark data according to the detection rate of "1" (whether bits "1" of preset percentage or more are detected among the bits as electronic watermark data.

Specifically, an address pattern corresponding to a pattern is stored in semiconductor memory 219 or the like (S201). Then, when the disk recording/reproducing apparatus reads out the pattern from the file identifier descriptor FID of the disk, an address pattern corresponding to the pattern is read out from the semiconductor memory 219. The address pattern is compared with the electronic watermark data extracted from the error correction circuit of the optical disk to detect their similarity (S203). If their similarity is equal to or larger than a preset value, it is determined that the electronic watermark data is detected according to the pattern stored in the file identifier descriptor FID, and the validity of the disk is determined.

In the case of the pattern of FIG. 11, it is effective to check data in the extracted electronic watermark data inserting position so as to detect electronic watermark data according to the detection rate of "0" (whether bits "0" of a preset percentage or more are detected among the bits as electronic watermark data).

Validity determination of a disk is performed in the same manner as in FIG. 10. The inserting positions of electronic watermark data are set in parallel lines in FIG. 10 and are set in an X-like shape in FIG. 11.

In FIG. 12, data in the inserting positions for the extracted electronic watermark data is verified, and the electronic watermark data is detected according to a detection rate of a bit string of alternately and repetitively arranged "1" and "0". That is, in the pattern of FIG. 12, a bit string of alternately arranged 1's and 0's are distributed on an oblique line. Also, in this case, when the X-like address pattern stored in the file identifier descriptor FID is detected, an address pattern is read out from the semiconductor memory 219 according to the X-like pattern. The electronic watermark data extracted from the error correction circuit of the optical disk and the X-like address pattern are compared to detect their similarity. If their similarity is equal to or larger than a preset value, the disk is determined to be valid.

Next, a UDF format used in a DVD to which the copy protecting system of this invention is applied is explained in detail below.

Schematic Explanation of UDF

<<What is UDF?>>

UDF is the abbreviation for universal disk format and corresponds to a rule relating to file management methods mainly for disk-like data recording mediums. CD-ROM, CD-R, CD-RW, DVD-video, DVD-ROM, DVD-R, DVD-RAM and the like utilize the UDF format specified according to International Standard Specification "ISO9660".

The UDF file management method is a hierarchical file system that has a route directory as a parent directory and manages files in a tree format.

The UDF format may be based on the DVD-RAM specification, but may also be applied to contents of the DVD-ROM specification.

<<Outline of UDF>><Recording Contents of File Data to Data Recording Medium>

When data is recorded on a data recording medium, a set of data items called "file data" is recorded in the file data unit. In order to distinguish individual file data from other file data, independent file names are attached to individual file data items.

File management and file searches are easily performed by dividing file data into groups, each group containing a plurality of file data items having common data contents. A group of a plurality of file data items is called a "directory" or "folder". An independent directory name (or folder name) is attached to each directory (or folder).

Further, a plurality of directories (or folders) are collected to make an upper-level directory (or upper-level folder) as an upper-level hierarchical group, and file data and a directory (or folder) are referred to generally as a file.

When data is recorded, all of the data items relating to the following items (a) to (c) are recorded on a data recording medium (for example, the disk 10 shown in FIG. 1A):

(a) data contents of file data;

(b) a file name corresponding to file data; and (c) a storage location of file data (one of the directories under which data is to be stored).

Further, all of the data items relating to the following items (d) and (e) are recorded on the data recording medium (10).

(d) a directory name (or folder name) of each directory (or folder); and (e) a position that identifies the upper-level directory (or folder) that becomes a parent directory.

FIG. 14 is a diagram that shows the basic relation between the hierarchical file system structure and data contents recorded on the data recording medium (DVD-RAM disk 10). In FIG. 14, a simple example of the hierarchical file system structure is shown in the upper portion of the figure and an example of the file system recording contents according to the UDF file format is shown in the lower portion of the figure.

In FIG. 14, the logic block (or sector) size is 2048 bytes. A group of continuous logic blocks (or continuous sectors) is called an "extent" (or aggregate). Access to file data recorded on the medium is made by reading sequentially data and repeatedly accessing addresses using an access route indicated by the arrows shown in FIG. 14.

<Simple Example of Hierarchical File System Structure>

Figures 19, 20:
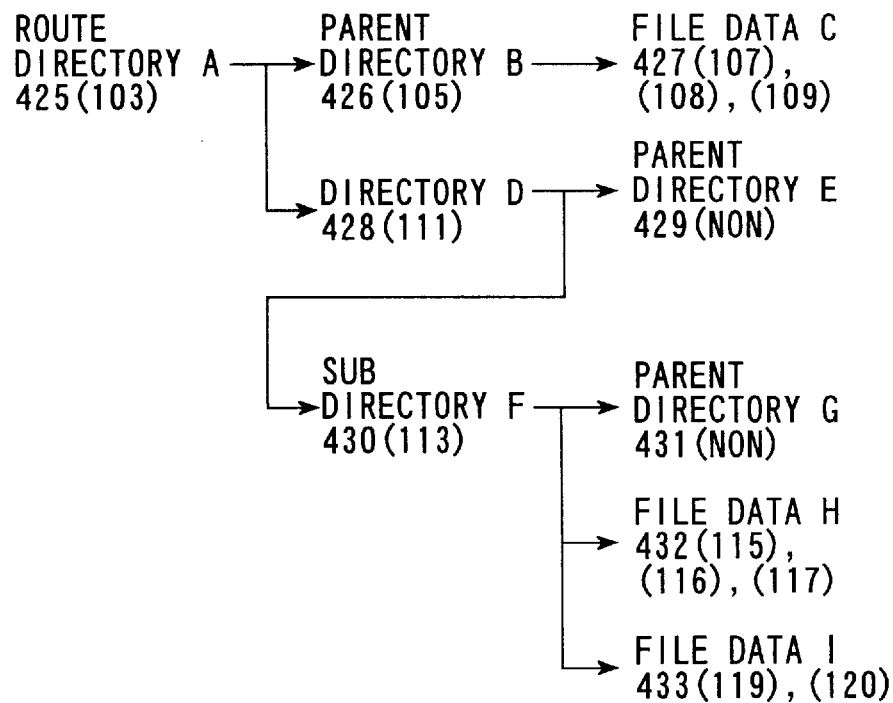
FIG. 19 is a diagram that illustrates the description contents of a file identifier descriptor that is partly extracted.
FIG. 20 is a diagram that illustrates an example of the construction of a file system.

The file management system of almost all operating systems, such as UNIX, MacOS, MS-DOS, Windows and the like have a tree-form hierarchical file structure as shown by an example in FIGS. 14 and 20.

In FIG. 14, one parent route directory 401 is provided for one disk drive. For example, when one hard disk drive HDD is divided into a plurality of partitions, each partition unit is considered one disk drive, and a sub directory 402, having file data 403, is provided under the parent route directory.

In addition, the file data 403 may be stored in a directory under the route directory 401, and a complicated hierarchical structure in which a plurality of sub directories 402 are serially connected may be provided.

<File System Recording Contents on Data Recording Medium>

File system data is recorded in a logic block unit (or logic sector unit), and the following data is mainly provided as the contents recorded in each logic block.

File ID descriptor FID: a descriptor sentence indicating file data that describes a file type and a file name, such as a route directory name, sub directory name, file data name, or the like. In the file ID descriptor FID, the recording positions of data relating to the contents of the directory and the data contents of file data following the FID are described.

File entry FE: a descriptive sentence indicating the recording position of the file contents that describes positions, such as logic block numbers, on the data recording medium in which data relating to the directory contents, such as the sub directory name, and the contents of file data, are recorded.

The central portion of FIG. 14 indicates an example of the recording contents obtained when data of the file system structure, as shown in the upper portion of FIG. 14, is recorded on data recording medium 10. The contents of the above example is more specifically explained below.

The contents of the route directory 401 are indicated in logic block number "1".

In FIG. 14, the sub directory 402 is located in the route directory 401. Accordingly, data relating to sub directory 402 is described in a file ID descriptor (FID) 404 as contents of the route directory 401. Although not shown in FIG. 14, data of the route directory 401 is described in the same logic block by using a sentence of the file ID descriptor.

In the file ID descriptor 404 of the route directory 401, the recording position of a file entry (FE) 405, indicating the position in which the contents of the sub directory 402 are recorded, is described by use of a long allocation descriptor (LAD(2)).

In logic block number "2", file entry 405 is recorded, indicating the position in which the contents of the sub directory 402 are stored.

In the example of FIG. 14, only file data 403 is present in the sub directory 402. Accordingly, the contents of sub directory 402 indicate the recording position of a file ID descriptor 406 in which data relating to the file data 403 is described.

In the file entry 405, the short allocation descriptor indicates (AD(3)) that the contents of sub directory 402 are recorded in the logic block 3.

The contents of sub directory 402 are recorded in logic block number "3".

In FIG. 14, because file data 403 is present in sub directory 402, data relating to file data 403 is described by file ID descriptor 406 as the contents of sub directory 402. Although not shown in FIG. 14, data in sub directory 402 is described in the same logic block by a sentence of the file ID descriptor.

In file ID descriptor 406 under file data 403, the recording position of a file entry 407, indicating a position in which the contents of the file data 403 are recorded, is described by use of the long allocation descriptor (LAD(4)).

In logic block number "4", file entry 407 is recorded, indicating the position in which the contents (408, 409) of file data 403 are stored.

The short allocation descriptor in file entry 407 describes that the file data 403 contents (408, 409) are recorded in the fifth and sixth logic blocks (AD(5), AD(6)).

In logic block number "5", the file data contents 408 of file data 403 are stored.

In logic block number "6", the file data contents 409 of file data 403 are stored.

<Method for Accessing File Data along Data of FIG. 14>

As described above, in the file ID descriptor FID and file entry FE, logic block numbers, describing data items succeeding thereto, are recorded.

In the same manner as a method for reaching file data 403 via sub directory 402, while descending the hierarchy from the route directory 401, the contents of the target file data are accessed, while data in the logic block on the data recording medium 10 is reproduced sequentially according to the logic block numbers described in the file ID descriptor FID and file entry.

In order to access file data 403 of FIG. 14, logic block (1) data is first read out and then the logic block (2) data is read out according to the LAD(2) of logic block (1). Since file data 403 is present in sub directory 402, the file ID descriptor FID of sub directory 402 is searched to read AD(3). Then, logic block (3) data is read out according to the read out AD(3). Because LAD(4) is described in the read out data, logic block (4) data is read out, and the file ID descriptor FID relating to file data 403 is searched for. Logic block (5) data is read out according to AD(5) described in logic block (4), and logic block (6) is reached according to AD(6).

Specific Explanation of Contents of Each
Descriptive Sentence (Descriptor) of UDF
<<Descriptive Sentence of Logic Block Number>>
<Allocation Descriptor>

As described previously, a descriptive sentence indicating the position (or logic block number) in which data contained in part of the file ID descriptor FID and file entry is recorded is called an allocation descriptor (AD).

The allocation descriptor includes a long allocation descriptor and short allocation descriptor.

<Long Allocation Descriptor>

FIG. 15 is a diagram that illustrates the contents of a long allocation descriptor, indicating the recording position of a continuous sector aggregate (or extent) on the data recording medium.

The long allocation descriptor LAD (or logic block number) is defined by the length of the extent 410, position of the extent 411, and its implementation use 412.

The length of the extent 410 expresses the logic block number by using 4 bytes, the address of the extent 411 expresses a corresponding logic block number by using 4 bytes, and the implementation use 412 expresses data used for a calculation process by using 8 bytes.

In this example, in order to simplify the description, an abbreviated symbol of LAD (with a logic block number) is used for describing the long allocation descriptor.

<Short Allocation Descriptor>

FIG. 16 is a diagram that illustrates the descriptive contents of a short allocation descriptor, indicating the recording position of a continuous sector aggregate (or extent) on the data recording medium 10.

The short allocation descriptor (AD) (with a logic block number) is defined by the length of the extent 410 and its position 411.

The length of the extent 410 expresses the logic block number by using 4 bytes, and the position of the extent 411 expresses a corresponding logic block number by using 4 bytes.

In order to simplify the description of the short allocation descriptor, an abbreviated symbol of AD (with a logic block number) is used.

<Unallocated Space Entry>

FIG. 17 is a diagram that illustrates the contents of a descriptive sentence used as an unallocated space entry (USE) for searching for a non-recorded continuous sector aggregate (or non-recorded extent) on the data recording medium.

In FIG. 17, the file type=1 in an ICB tag indicates an unallocated space entry, the file type=4 in the ICB tag indicates a directory, and the file type=5 in the ICB tag indicates file data.

The unallocated space entry is a descriptive sentence used in the space table (see FIGS. 21 to 23), indicating the recorded logic block or non-recorded logic block in the recording area of the data recording medium 10.

The unallocated space entry USE includes a descriptive tag 413, ICB tag 414, total length of allocation descriptive string 415, and an allocation descriptor 416.

The descriptive tag 413 indicates an identifier of the description contents set to "263".

The ICB tag 414 indicates a file type.

The file type=1 in the ICB tag indicates an unallocated space entry USE, the file type=4 indicates a directory, and the file type=5 indicates file data.

The total length of allocation descriptive string 415 expresses the total byte number of the allocation descriptive string by using four bytes.

The allocation descriptor 416 is a list of recording positions (or logic block numbers) on the medium 10 of each extent (or sector aggregate). For example, the allocation descriptors 16 are listed as (AD(*), AD(*), . . . , AD(*)).

<File Entry>

FIG. 18 is a diagram that illustrates an extracted part of the description contents of file entry that indicates the recording position of a file specified in the file structure having the hierarchical structure as shown in FIG. 14.

In FIG. 18, the file type=1 in the ICB tag indicates an unallocated space entry, the file type=4 in the ICB tag indicates a directory, and the file type=5 in the ICB tag indicates file data.

The file entry includes a descriptive tag 417, ICB tag 418, permission data 419, and allocation descriptor 420.

The descriptive tag 417 indicates an identifier of the description contents set to "261".

The ICB tag 418 indicates a file type, and its contents are the same as the contents of the ICB tag 414 of the unallocated space entry of FIG. 17.

The permission data 419 indicates permission data for the record/reproduce/delete process for each user. It is used mainly for attaining the security of the file.

The allocation descriptor 420 describes the position in which the contents of the file are recorded by arranging the short allocation descriptors for each extent. For example, they are arranged as FE(AD(*), AD(*), . . . , AD(*)).

<File ID Descriptor FID>

FIG. 19 is a diagram that illustrates an extracted part of the file ID descriptor that describes data of the file (as route directory, sub directory, file data and the like) in the file structure, having the hierarchical structure as shown in FIG. 14.

In FIG. 19, the file characteristic (for each file type) indicates one of the parent directory, directory, file data and file elimination flag. As the setting example of the AV file identifier (424), 1) an independent extension (.VOB, for example) is attached as the file identifier, and 2) an independent flag is inserted into the padding (437).

The file ID descriptor FID includes a descriptive tag 421, file character 422, data control block ICB 423, file identifier 424 and padding 437.

The descriptive tag 421 indicates an identifier of the description contents set to "257".

The file character 422 indicates a file type and indicates one of the parent directory, directory, file data and file elimination flag.

The data control block ICB 423 describes the FE position (file entry position) corresponding to the file by using the long allocation descriptor.

The file identifier 424 describes the directory name or file name.

The padding 437 is a dummy field added for adjusting the total length of the file identifier 424 and "0" (or "000h") is generally recorded in all positions.

In the present invention, computer data (DA1, DA3) and AV data (DA2) may occur at the same time in one volume space and file. In this case, two types of files, computer files and AV files, can be mixed together in the one file.

As the setting method for setting the AV file identifier for distinguishing the AV file from the computer file, the following two methods are considered.

1) A preset extension (.VOB, for example) is attached to the end of the file name of the AV file;

2) An independent flag (not shown) is inserted in the padding 437 of the AV file (the flag of "1" indicates an AV file and the flag of "0" indicates a computer file.

Further, an encrypted user password can be recorded in the field of the padding 437.

FIG. 20 is a diagram showing a file system structure obtained by more generalizing the file structure as shown in FIG. 14. In FIG. 20, numerals in parentheses indicate data relating to the contents of the directory or logic block numbers on the data recording medium 10 in which the data contents of file data are stored.

Example of File Structure Description Recorded According to UDF

The content (or the structure of the file system) described previously is explained below.

As the management method of non-recorded position on the data recording medium (such as a DVD-RAM disk) 10, the following methods are provided.

[Space Bit Map Method]

The Space Bit Map Method is a method that uses a space bit map descriptor for setting a flag of "recorded" or "non-recorded" in the bit map manner in all of the logic blocks of the recording area of the data recording medium.

[Space Table Method]

The Space Table Method is a method that describes the recorded logic block number by listing the short allocation descriptors by using the descriptive system of FIG. 17.

In this case, in order to simultaneously explain both of the methods, both methods (space bit map method and space table method) are shown in FIGS. 21 to 23, but in practice, it is rare to simultaneously use the two methods to record data on the data recording medium, and only one of the two methods is used.

Further, the description content (being the arrangement and description of the short allocation descriptor) in the space table is set according to the file system structure of FIG. 20, but this is not limiting and the short allocation descriptor can be freely described.

FIGS. 21 to 23 show an example in which data of the file system structure of FIG. 20 is recorded on the data recording medium 10 according to the UDF format. FIG. 21 shows the front portion, FIG. 22 shows the middle portion, and FIG. 23 shows the latter portion.

In FIG. 23, LSN=logic sector number 491, LSN=logic block number 492 and LLSN=final logic sector number 493. It is rare to simultaneously record the space bit map and space table and, generally, only one of the space bit map and the space table is recorded.

As shown in FIGS. 21 to 23, a logic sector in which data relating to the file structure 486 and file data 487 is recorded is particularly called a "logic block". A logic block number (LBN) is set in connection with the logic sector number (LSN) (where the length of the logic block equals the length of the logic sector and is 2048 bytes).

The contents of the main descriptors described in FIGS. 21 to 23 are as follows.

Extent area descriptive start 445 indicates the start position of a volume recognition sequence (VRS).

A volume structure descriptor 446 describes the explanation for the contents of a disk (or the contents of the volume).

A boot descriptor 447 is a portion that describes the process contents at the boot time, for example, the boot start position of the computer system.

Extent area descriptive end 448 indicates the end position of the volume recognition sequence (VRS).

A partition descriptor 450 describes partition data such as the size of the partition.

In the DVD-RAM, one partition is assigned for each volume as a general rule.

A logic volume descriptor 454 describes the contents of the logic volume.

An anchor volume descriptive pointer 458 indicates the record end position of recorded data in the recording area of the data recording medium 10.

Reserve data items 459 to 465 are adjusting areas for acquiring logic sector numbers for recording specified descriptors and "00h" is written therein at first.

A reserve volume descriptive sequence 467 is a backup area of data recorded in the main volume descriptive sequence 449.

Access Method to File Data at Reproducing Time

A method for accessing file data on the data recording medium 10 is explained by considering a case where, for example, the data content of file data H432 of FIG. 2 is reproduced by using file system data shown in FIGS. 21 to 23.

(1) Data of the boot descriptor 447 in the area of the volume recognition sequence 444 as the boot area at the time of start of the disk recording/reproducing apparatus or at the time of loading of the data recording medium is reproduced. The process at the boot time is started according to the description contents of the boot descriptor 447.

Accordingly, if there is no specified process at boot time, the following operation is effected.

(2) First, data of the logic volume descriptor 454 in the area of the main volume descriptive sequence 449 is reproduced.

(3) Logic volume contents usage 455 is described in the logic volume descriptor 454. In this portion, a logic block number indicating the position in which the file set descriptor 472 is recorded is described in the form of a long allocation descriptor (see FIG. 15) (in the example of FIGS. 21 to 23, LAD(100) is set, and therefore, it is recorded in the 100th logic block).

(4) The 100th logic block (400th in the logic sector number) is accessed to reproduce the file set descriptor 472. In the route directory ICB473 of the file set descriptor, a position (or logic block number), in which the file entry relating to the route directory A425 is recorded, is described in the form of a long allocation descriptor (see FIG. 15). In the example of FIGS. 21 to 23, LAD(102) is set and recorded in the 102nd logic block.

Accordingly, according to LAD(102) of the route directory ICB 473, the following operation is effected.

(5) The 102nd logic block is accessed to reproduce the file entry 475 relating to the route directory A425 and the read out position (or logic block number) in which data relating to the contents of the route directory A425 is recorded e.g., (AD(103): recorded in the 103rd logic block).

(6) The 103rd logic block is accessed to reproduce data relating to the contents of the route directory A425.

Because the file data H432 lies under the directory D428 series, a file ID descriptor FID relating to the directory D428 is searched for, and a logic block number (LAD(110): recorded in the 110th logic block, although not shown in FIGS. 21 to 23) in which the file entry relating to the directory D428 is recorded is read out.

(7) The 110th logic block is accessed to reproduce the file entry 480 relating to the directory D428 and the read out position (logic block number) in which data relating to the contents of the directory D428 is recorded (AD(111): recorded in the 111th logic block).

(8) The 111th logic block is accessed to reproduce data relating to the contents of the directory D428.

Because the file data H432 lies directly under the sub directory F430, a file ID descriptor FID relating to the sub directory F430 is searched for, and a logic block number (LAD(112): recorded in the 112th logic block) in which the file entry relating to the sub directory F430 is recorded is read out.

(9) The 112th logic block is accessed to reproduce the file entry 482 relating to the sub directory F430, and the read out position (logic block number) in which data relating to the contents of the sub directory F430 is recorded (AD(113): recorded in the 113th logic block).

(10) The 113th logic block is accessed to reproduce data relating to the contents of the sub directory F430 and a file ID descriptor FID relating to the file data H432 is searched for. Then, a logic block number in which the file entry relating to the file data H432 is recorded is read out (LAD(114): recorded in the 114th logic block).

(11) The 114th logic block is accessed to reproduce the file entry 484 relating to the file data H432 and the read out position in which the data content 489 of the file data H432 is recorded.

(12) Data is reproduced from the data recording medium in an order of the logic block number described in the file entry 484 relating to the file data H432, and the data content 489 of the file data H432 is read out.

Specified File Data Contents Changing Method

Next, the processing method including the access method is explained in a case where, for example, the data content of the file data H432 is changed by using the file system data shown in FIGS. 21 to 23.

(1) A difference between the amounts of data contents before and after the change of the file data H432 is derived and divided by 2048 bytes, and the number of logic blocks that become necessary or unnecessary for recording data obtained after the change is previously calculated.

(2) Data of the boot descriptor 447 in the area of the volume recognition sequence 444 as the boot area at the time of start of the disk recording/reproducing apparatus or at the time of loading of the data recording medium is reproduced. The process at the boot time is started according to the description contents of the boot descriptor 447.

Accordingly, if there is no specified process at the boot time, the following operation is effected.

(3) First, the partition descriptor 450 in the area of the main volume descriptor sequence 449 is reproduced, and data of the partition contents usage 451 described therein is read out. The recording position of the space table or space bit map is indicated in the partition contents usage 451 (which is also called a partition header descriptor).

The space table position is described in the form of short allocation descriptor in the column of the unallocated space table 452 (AD(80) in the example of FIGS. 21 to 23).

The space bit map position is described in the form of short allocation descriptor in the column of the unallocated space bit map 453 (AD(0) in the example of FIGS. 21 to 23).

(4) Access is made to the logic block number (0) in which the space bit map read out in the item (3) is described. Space bit map data is extracted from the space bit map descriptor, a non-recorded logic block is searched for, and use of logic blocks of a number obtained as the calculation result of the item (1) is registered as a space bit map descriptive data rewriting process.

(4) Access is made to the logic block number (80) in which the space table read out in the item (3) is described.

Data from the unallocated space entry USE (AD(*)) of the space table to USE (AD(*), AD(*)) of the file data I is read out, a non-recorded logic block is searched for, and use of logic blocks of a number obtained as the result of calculation in the item (1) is registered as the space table data rewriting process.

In the actual process, one of the processes (4) and (4) is effected.

(5) Next, data of the logic volume descriptor 454 in the area of the main volume descriptive sequence 449 is reproduced.

(6) Logic volume contents usage 455 is described in the logic volume descriptor 454. In this portion, a logic block number indicating the position in which the file set descriptor 472 is recorded is described in the form of a long allocation descriptor (FIG. 15) (it is recorded in the 100th logic block based on LAD(100) in the example of FIGS. 21 to 23).

(7) The 100th logic block (400th in the logic sector number) is accessed to reproduce the file set descriptor 472. The position (or logic block number) in which the file entry relating to the route directory A425 is recorded is described in the form of a long allocation descriptor (see FIG. 15) in the route directory ICB 473 of the file set descriptor (it is recorded in the 102nd logic block based on LAD(102) in the example of FIGS. 21 to 23).

The following operation is effected according to LAD (102) in the route directory ICB 473.

(8) The 102nd logic block is accessed to reproduce the file entry 475 relating to the route directory A425, and the read out position (logic block number) in which data relating to the contents of the route directory A425 is recorded (AD (103)).

(9) The 103rd logic block is accessed to reproduce data relating to the contents of the route directory A425.

Because the file data H432 lies under the directory D428 series, a file ID descriptor FID relating to the directory D428 is searched for, and a logic block number (LAD(110)) in which the file entry relating to the directory D428 is recorded is read out.

(10) The 110th logic block is accessed to reproduce the file entry 480 relating to the directory D428, and the read out position (logic block number) in which data relating to the contents of the directory D428 is recorded (AD(111)).

(11) The 111th logic block is accessed to reproduce data relating to the contents of the directory D428.

Because the file data H432 lies directly under the sub directory F430, a file ID descriptor FID relating to the sub directory F430 is searched for, and a logic block number (LAD(112)) in which the file entry relating to the sub directory F430 is recorded is read out.

(12) The 112th logic block is accessed to reproduce the file entry 482 relating to the sub directory F430, and the read out position (logic block number) in which data relating to the contents of the sub directory F430 is recorded (AD (113)).

(13) The 113th logic block is accessed to reproduce data relating to the contents of the sub directory F430, and a file ID descriptor FID relating to the file data H432 is searched for. Then, a logic block number (LAD(114)) in which the file entry relating to the file data H432 is recorded is read out.

(14) The 114th logic block is accessed to reproduce the file entry 484 relating to the file data H432, and the read out position in which the data content 489 of the file data H432 is recorded.

(15) The data contents 489 of the file data H432 obtained after the change are recorded by taking the logic block number additionally registered in the process (4) or (4) into consideration.

Specified File Data/Directory Delete Processing Method

As one example, a method for deleting the file data H432 or sub directory F430 is explained.

(1) Data of the boot descriptor 447 in the area of the volume recognition sequence 444, as the boot area at the time of start of the disk recording/reproducing apparatus or at the time of loading of the data recording medium, is reproduced. The process at the boot time is started according to the description contents of the boot descriptor 447.

Accordingly, if there is no specified process at boot time, the following operation is effected.

(2) First, data of the logic volume descriptor 454 in the area of the main volume descriptor sequence 449 is reproduced.

(3) Logic volume contents usage 455 is described in the logic volume descriptor 454, and in this portion, a logic block number indicating the position in which the file set descriptor 472 is recorded is described in the form of a long allocation descriptor (FIG. 15) (in the example of FIGS. 21 to 23, it is recorded in the 100th logic block based on LAD(100)).

(4) The 100th logic block (400th in the logic sector number) is accessed to reproduce the file set descriptor 472. In the route directory ICB473 of the file set descriptor, a position (or logic block number) in which the file entry relating to the route directory A425 is recorded, is described in the form of long allocation descriptor (FIG. 15) (in the example of FIGS. 21 to 23, it is recorded in the 102nd logic block based on LAD(102)).

In this case, according to LAD(102) of the route directory ICB 473, the following operation is effected.

(5) The 102nd logic block is accessed to reproduce the file entry 475 relating to the route directory A425, and the read out position (logic block number) in which data relating to the contents of the route directory A425 is recorded (AD(103)).

(6) The 103rd logic block is accessed to reproduce data relating to the contents of the route directory A425.

Because the file data H432 lies under the directory D428 series, a file ID descriptor FID relating to the directory D428 is searched for, and a logic block number (LAD(110)) in which the file entry relating to the directory D428 is recorded is read out.

(7) The 110th logic block is accessed to reproduce the file entry 480 relating to the directory D428, and the read out position (logic block number) in which data relating to the contents of the directory D428 is recorded (AD(111)).

(8) The 111th logic block is accessed to reproduce data relating to the contents of the directory D428.

Because the file data H432 lies directly under the sub directory F430, a file ID descriptor FID relating to the sub directory F430 is searched for.

Assume now that the sub directory F430 is deleted. In this case, a "file delete flag" is set in the file characteristic 422 (FIG. 19) in the file ID descriptor FID relating to the sub directory F430.

Then, a logic block number (LAD(112)) in which the file entry relating to the sub directory F430 is recorded is read out.

(9) The 112th logic block is accessed to reproduce the file entry 482 relating to the sub directory F430, and the read out position (logic block number) in which data relating to the contents of the sub directory F430 is recorded (AD(113)).

(10) The 113th logic block is accessed to reproduce data relating to the contents of the sub directory F430, and a file ID descriptor FID relating to the file data H432 is searched for.

Next, assume that the file data H432 is deleted. In this case, a "file delete flag" is set in the file characteristic 422 (FIG. 19) in the file ID descriptor FID relating to the sub directory H432.

Then, a logic block number (LAD(114)) in which the file entry relating to the file data H432 is recorded is read out.

(11) The 114th logic block is accessed to reproduce the file entry 484 relating to the file data H432, and the read out position in which the data content 489 of the file data H432 is recorded.

In a case where the file data H432 is deleted, a logic block in which the data content 489 of the file data H432 is recorded is released by the following method, and the logic block is registered as the non-record state.

(12) Next, the partition descriptor 450 in the area of the main volume descriptive sequence 449 is reproduced to read out data of the partition contents usage 451. The recording position of the space table or space bit map is indicated in the partition contents usage as partition header descriptor 451.

The space table position is described in the form of a short allocation descriptor in the column of the unallocated space table 452 (AD(80) in the example of FIGS. 21 to 23).

The space bit map position is described in the form of a short allocation descriptor in the column of the unallocated space bit map 453 (AD(0) in the example of FIGS. 21 to 23).

(13) The logic block number (0) in which the space bit map read out in the process (12) is described is accessed, and the "to-be-released logic block number" obtained as the result of the process (11) is rewritten to the space bit map descriptor.

(13*) The logic block number (80) in which the space table read out in the process (12) is described is accessed, and the "to-be-released logic block number" obtained as the result of the process (11) is rewritten to the space table.

In the actual process, one of the processes (13) and (13*) is effected.

In a case where the file data H432 is deleted, the following processes are effected.

(12) The same processes as the above processes (10) and (11) are effected to read out the position in which the data content 490 of file data I 433 is recorded.

(13) Next, the partition descriptor 450 in the area of the main volume descriptive sequence 449 is reproduced to read out data of the partition contents usage 451 described therein. The recording position of the space table or space bit map is indicated in the partition contents usage (partition header descriptor) 451.

The space table position is described in the form of a short allocation descriptor in the column of the unallocated space table 452 (AD(80) in the example of FIGS. 21 to 23).

The space bit map position is described in the form of a short allocation descriptor in the column of the unallocated space bit map 453 (AD(0) in the example of FIGS. 21 to 23).

(14) The logic block number (0) in which the space bit map read out in the process (13) is described is accessed, and the "to-be-released logic block number" obtained as a result of the processes (11) and (12) is rewritten to the space bit map descriptor.

(14*) The logic block number (80), in which the space table read out in the process (13) is described, is accessed and the "to-be-released logic block number" obtained as a result of the processes (11) and (12) is rewritten to the space table.

In the actual process, one of the processes (14) and (14*) is effected.

File Data/Directory Adding Process

As one example, an accessing/adding processing method for newly adding file data or directory under the sub directory F430 is explained.

(1) In the case of adding file data, the capacity of the file data contents to be added is checked, the value is divided by 2048 bytes, and the number of logic blocks necessary for adding the file data is previously calculated.

(2) Data of the boot descriptor 447 in the area of the volume recognition sequence 444 as the boot area at the time of start of the disk recording/reproducing apparatus or at the time of loading of the data recording medium is reproduced. The process at the boot time is started according to the description contents of the boot descriptor 447.

At this time, if there is no specified process at the boot time, the following operation is effected.

(3) First, the partition descriptor 450 in the area of the main volume descriptive sequence 449 is reproduced to read out data of the partition contents usage 451. The recording position of the space table or space bit map is indicated in the partition contents usage (partition header descriptor) 451.

The space table position is described in the form of short allocation descriptor in the column of the unallocated space table 452 (AD(80) in the example of FIGS. 21 to 23).

The space bit map position is described in the form of short allocation descriptor in the column of the unallocated space bit map 453 (AD(0) in the example of FIGS. 21 to 23).

(4) The logic block number (0) in which the space bit map read out in process (3) is described is accessed. Space bit map data is extracted from the space bit map descriptor, a non-recorded logic block is searched for, and use of logic blocks of a number obtained as the result of calculation in process (1) is registered (space bit map descriptive data rewriting process).

(4*) The logic block number (80) in which the space table read out in the process (3) is described is accessed. Data from USE (AD(*)) 461 of the space table to USE (AD(*), AD(*)) 470 of the file data I is read out, a non-recorded logic block is searched for, and use of logic blocks of a number obtained as the result of calculation in the process (1) is registered (space table data rewriting process).

In the actual process, one of the processes (4) and (4*) is effected.

(5) Next, data of the logic volume descriptor 454 in the area of the main volume descriptive sequence 449 is reproduced.

(6) Logic volume contents usage 455 is described in the logic volume descriptor 454, and in this portion, a logic block number indicating the position, in which the file set descriptor 472 is recorded, is described in the form of long allocation descriptor (FIG. 15) (it is recorded in the 100th logic block based on LAD(100) in the example of FIGS. 21 to 23).

(7) The 100th logic block (400th in the logic sector number) is accessed to reproduce the file set descriptor 472. The position (logic block number), in which the file entry relating to the route directory A425 is recorded, is described in the form of long allocation descriptor (FIG. 15) in the route directory ICB 473 of the file set descriptor (the file entry relating to the route directory A425 is recorded in the 102nd logic block based on LAD(102) in the example of FIGS. 21 to 23).

The following processes are effected according to LAD (102) of the route directory ICB 473.

(8) The 102nd logic block is accessed to reproduce the file entry 475 relating to the route directory A425, and the read out position (logic block number) in which data relating to the contents of the route directory A425 is recorded (AD (103)).

(9) The 103rd logic block is accessed to reproduce data relating to the contents of the route directory A425.

A file ID descriptor FID relating to the directory D428 is searched for, and a logic block number (LAD(110)), in which the file entry relating to the directory D428 is recorded, is read out.

(10) The 110th logic block is accessed to reproduce the file entry 480 relating to the directory D428, and the read out position (logic block number) in which data relating to the contents of the directory D428 is recorded (AD(111))

(11) The 111th logic block is accessed to reproduce data relating to the contents of the directory D428.

A file ID descriptor FID relating to the sub directory F430 is searched for, and a logic block number (LAD(112)), in which the file entry relating to the sub directory F430 is recorded, is read out.

(12) The 112th logic block is accessed to reproduce the file entry 482 relating to the sub directory F430, and the read out position (logic block number) in which data relating to the contents of the sub directory F430 is recorded (AD (113)).

(13) The 113th logic block is accessed to register the file ID descriptor FID of the directory or file data to be newly added to data relating to the contents of the sub directory F430.

(14) The logic block number position registered in the process (4) or (4*) is accessed to describe the file entry relating to the directory or file data to be newly added.

(15) The logic block number position described in the short allocation descriptor in the file entry in the process (14) is accessed to record data contents of file data to be added or the file ID descriptor FID of a parent directory relating to the directory to be added.

In FIGS. 21 to 23, LSN is an abbreviated symbol indicating the logic sector number (LSN) 491, LBN is an abbreviated symbol indicating the logic block number (LBN) 492, and LLSN is an abbreviated symbol indicating the last logic sector number (last LSN) 493.

<<Feature of UDF>>

<Explanation for Feature of UDF>

The feature of the universal data format UDF is explained below in comparison with the file allocation table FAT used in a hard disk HDD, floppy disk FDD, optical-magnetic disk MO or the like.

(1) In the FAT, the management table (file allocation table) of allocation of a file to the data recording medium is locally and collectively recorded on the data recording medium, but in the UDF, file management data can be distributed and recorded in desired positions on the disk.

Because management data is controlled collectively in the file management area in the FAT, it is suitable for applications that require the file structure to be frequently altered (particularly, for frequently rewriting application). This is because management data is recorded in a concentrated position and can be easily rewritten. In the FAT, because the recording position of file management data is determined previously, it is necessary to use a recording medium of high reliability (having a less defective area).

In the UDF, because file management data is arranged in a distributed manner, and it is suitable for application (mainly, additionally describing application), in which the file structure is not so often greatly changed, and a new file structure is added later to a portion under the hierarchy (mainly, a portion under the route directory). This is because an altering portion of the former file management data is less at the time of additional description.

Further, since recording position of the distributed file management data can be freely specified, it is possible to record data in a position other than the inherent defective portion.

Since file management data can be recorded in a desired position, the advantage of the FAT can be attained by collectively recording all of the file management data items in one portion, and it can be considered as a file system having a great deal of flexibility.

(2) In the UDF, the minimum unit (such as the minimum logic block size or minimum logic sector size) is large, and it is suitable for recording of video data or music data having a large amount of recording data.

That is, the logic sector size of FAT is 512 bytes, but the logic sector (block) size of UDF is 2048 bytes and is thus larger.

In the UDF, the recording position on the disk for file data and file management data is described in the allocation descriptor as a logic sector (block) number.

A medium on which digital data having an error correction code attached thereto can be recorded is used as a data recording medium used in the copy protecting system, using the electronic watermark according to the present invention. Data obtained by adding electronic watermark data, whose capacity does not exceed the error correction ability of the reproducing side to the digital data, is recorded on the data recording medium.

When data is reproduced from the data recording medium, the position in which the electronic watermark data is recorded on the data recording medium or the contents of the electronic watermark data are extracted and read out in a reproducing apparatus (or reproducing method) of the present invention. Whether data recorded on the data recording medium is original data or dishonestly copied data is determined based on the extracted and readout data contents.

The following advantages can be attained by using the copy protecting system using the electronic watermark according to the present invention.

(1) Dishonest copying on a recordable digital data recording medium such as a DVD-RAM disk can be stably and strongly prevented by a relatively simple method.

(2) The present invention can be applied to any type of data recording medium, including a recordable/deletable data recording medium (such as a DVD-RAM disk), a data recording medium (such as a DVD-R in which data only can be recorded) or a reproducing-only data recording medium (such as a DVD-ROM, or DVD video).

Further, the following advantages can be attained by applying a copy protecting system using the electronic watermark according to the present invention to an actual product.

(3) The structure of a disk reproducing apparatus or disk recording/reproducing apparatus can be simplified or the parts thereof can be commonly used by providing the same copy protect function for various types of disk reproducing apparatuses and disk recording/reproducing apparatuses, such as rewritable disk recording/reproducing apparatuses and reproducing-only disk reproducing apparatuses.

(4) Because the safe and strong copy protect function can be attained by adding a simple circuit to the conventional disk reproducing apparatus or disk recording/reproducing apparatus, the cost of the apparatus can be lowered easily.

(5) A person who has formed file data, inputs a password when the formed file data is recorded on a data recording medium. The data of the "password" is encrypted and recorded in the file management area (or FID), and it is recorded as electronic watermark data having a recording form different from that of the former data in a position (which is different from the file management area), in which the data contents of the file data are recorded. Thus, dishonest copying can be positively detected by recording the same data of the "password" in different recording forms in different positions on the data recording medium and comparing the recorded data items.

(6) An error correction code is attached to the electronic watermark data. Therefore, even if an error is introduced into the electronic watermark data because of the defect on the data recording medium on which it is recorded, the error can be corrected and correct data can be reproduced.

Additional advantages and modifications will readily occur to those skilled in the art. Accordingly, the invention in its broader aspects is not limited to the specific details and representative embodiments shown and described herein. Thus, various modifications may be made without departing from the spirit or scope of the general inventive concept as defined by the appended claims and their equivalents.

What is claimed is:

1. A data reproduction method for reproducing data made up of a plurality of error correction code blocks, each of the error correction code blocks including block data, inner parity code (PI) data serving as error correction data, and outer parity code (PO) data, each of the error correction code blocks having a plurality of electronic watermark information data, said method comprising:

extracting the electronic watermark information data, based on positional information data that represents where the electronic watermark information data is recorded in each of the error corrections code blocks; and checking through data included in one error correction code block by use of the inner parity code data, the outer parity code data and the block data, performing error correction processing on the data included said one error correction code block, and sequentially continuing checking through data with respect to each of the error correction code blocks by use of the inner parity code data, the outer parity code data and the block data, said electronic watermark information data being regarded as an error and subject to error correction, wherein said electronic watermark information data (a–p) of each of the error correction code blocks is randomly arranged in at least one of said block data, inner parity code (PI) data, and outer parity code (PO) data, and said electronic watermark information data (a–p) includes error correction code.

2. A data reproduction method according to claim 1, wherein said electronic watermark information data is present in said error correction data.

3. A data reproduction method according to claim 1, wherein said electronic watermark information data is present in said inner parity code data.

4. A data reproduction method according to claim 1, wherein said electronic watermark information data is present in said outer parity code data.

5. A data reproduction method according to claim 1, wherein said electronic watermark information data is present in both said inner parity code data and said outer parity code data.

6. A data reproduction method according to claim 1, wherein the electronic watermark information data present in each of the error correction code blocks has a data configuration that one row or one column corresponds to one bit.

7. A data reproduction method according to claim 1, wherein said electronic watermark information data is present in said block data.

8. A data encoding method comprising:

generating block data;

adding inner parity code data, which serves as error correction data, and parity code data to said block data, thereby making an error correction code block; and inserting electronic watermark information data in said error correction code block;

wherein said electronic watermark information data (a–p) of each of the error correction code blocks is randomly arranged in at least one of said block data, inner parity code (PI) data, and outer parity code (PO) data, said electronic watermark information data (a–p) includes error correction code, and the electronic watermark information data is regarded as an error and subjected to error correction.

9. A data reproduction method according to claim 8, wherein said electronic watermark information data is present in said block data.

10. A data reproduction method according to claim 8, wherein said electronic watermark information data is present in said error correction data.

11. A data reproduction method according to claim 8, wherein said electronic watermark information data is present in said inner parity code data.

12. A data reproduction method according to claim 8, wherein said electronic watermark information data is present in said outer parity code data.

13. A data reproduction method according to claim 8, wherein said electronic watermark information data is present in said inner parity code data and said outer parity code data.

14. A data reproduction method according to claim 8, wherein the electronic watermark information data present in the error correction code block has a data configuration that one row or one column corresponds to one bit.

15. A data reproduction method according to claim 8, wherein said electronic watermark information data is present in said block data.

16. A data reproduction method for reproducing data made up of a plurality of error correction code blocks, each of the error correction code blocks including block data, inner parity code (PI) data serving as error correction data, and outer parity code (PO) data, each of the error correction code blocks having a plurality of electronic watermark information data, said method comprising:

extracting the electronic watermark information data, based on positional information data that represents where the electronic watermark information data is recorded in each of the error correction code blocks; and correcting an error in one error correction code block by use of the inner parity code data, the outer parity code data and the block data and sequentially correcting an error in data with respect to each of the error correction code blocks by use of the inner parity code data, the outer parity code data and the block data, wherein said electronic watermark information data (a–p) of each of the error correction code blocks is randomly arranged in at least one of said block data, inner parity code (PI) data, and outer parity code (PO) data, and said electronic watermark information data (a–p) includes error correction code.

17. A data reproduction method according to claim 16, wherein said electronic watermark information data is present in said error correction data.

18. A data reproduction method according to claim 16, wherein said electronic watermark information data is present in said inner parity code data.

19. A data reproduction method according to claim 16, wherein said electronic watermark information data is present in said outer parity code data.

20. A data reproduction method according to claim 16, wherein said electronic watermark information data is present in both said inner parity code data and said outer parity code data.

21. A data reproduction method according to claim 16, wherein the electronic watermark information data present in each of the error correction code blocks has a data configuration that one row or one column corresponds to one bit.

22. A data reproduction method according to claim 16, wherein said electronic watermark information data is present in said block data.

* * * * *